(12) United States Patent
Jabri et al.

(10) Patent No.: US 7,548,987 B2
(45) Date of Patent: Jun. 16, 2009

(54) METHOD AND SYSTEM FOR IMPROVED TRANSCODING OF INFORMATION THROUGH A TELECOMMUNICATION NETWORK

(75) Inventors: Marwan Anwar Jabri, Tiburon, CA (US); David Martin Jack, Reading (GB); David John Myers, Glebe (AU)

(73) Assignee: Dilithium Holdings, Inc., Petaluma, CA (US)

( * ) Notice: Subject to any disclaimer, the term of this patent is extended or adjusted under 35 U.S.C. 154(b) by 151 days.

(21) Appl. No.: 11/825,309

(22) Filed: Jul. 3, 2007

(65) Prior Publication Data

US 2008/0059647 A1 Mar. 6, 2008

Related U.S. Application Data

(63) Continuation of application No. 10/388,375, filed on Mar. 12, 2003, now Pat. No. 7,266,611.

(60) Provisional application No. 60/364,402, filed on Mar. 12, 2002.

(51) Int. Cl.
*G06F 15/16* (2006.01)
(52) U.S. Cl. .................. 709/231; 709/223; 709/227; 709/230; 709/246
(58) Field of Classification Search ............. 709/223, 709/227, 230, 231, 246
See application file for complete search history.

(56) References Cited

U.S. PATENT DOCUMENTS

| 6,600,520 | B1 * | 7/2003 | Ward et al. ................... 348/722 |
| 6,628,300 | B2 * | 9/2003 | Amini et al. ................. 345/660 |
| 6,959,318 | B1 * | 10/2005 | Tso ............................ 709/203 |
| 6,963,975 | B1 * | 11/2005 | Weare ......................... 713/176 |
| 7,062,547 | B2 * | 6/2006 | Brown et al. ................. 709/221 |
| 2004/0158647 | A1 | 8/2004 | Omura |

OTHER PUBLICATIONS

CC/PP exchange protocol based on HTTP Extension Framework. http://www.w3.org/TR/NOTE-CCPPexchange. World Wide Web Consortium Ltd., Jun. 24, 1999.
Composite Capability/Preference Profiles (CC/PP): A user side framework for content negotiation. http://www.w3.org/TR/NOTE-CCPP. World Wide Web Consortium Ltd., Jul. 27, 1999.

(Continued)

*Primary Examiner*—Liangche A Wang
(74) *Attorney, Agent, or Firm*—Townsend and Townsend and Crew LLP

(57) ABSTRACT

A system (and methods) for transferring multimedia information from a source location to a destination location through one or more networks, which may be different. The system has a source output which provides a first stream of information in a first format. The system also has a destination input which receives a second stream of information in a second format. A proxy transcoder server ("PTS") is coupled between the source output and the destination input. The PTS has a transcoding module transcoding data. The PTS also has a capability module identifying a first capability of the source output and a second capability of the destination input, and selecting a transcoding process based upon the first capability and the second capability.

27 Claims, 27 Drawing Sheets

OTHER PUBLICATIONS

HTTP Extension Framework. http://www.w3.org/Protocols/HTTP/ietf-http-ext/draft-frystyk-http-extensions-03.txt. World Wide Web Consortium Ltd., Mar. 15, 1999.

ISO International standards 13818 series, "Generic Coding of Moving Pictures and Audio," Jul. 11, 1996.

ISO International standards 14496 series, Information Technology-Coding of audio-visual objects- Part 3: Audio Amendment 1: Audio Extentions, May 31, 2000.

ISO/IEC 13818-7: 1996(E), "MPEG-2 DIS 13818-7, (MPEG-2-Advanced Audio Coding, AAC," Nov. 1996.

ITU Recommendation G.723.1, Dual rate speech coder for multimedia communications transmitting at 5.3 and 6.3 kbit/s, 1996.

ITU Recommendation H.261, Video codec for audiovisual services at $p$ ×64 kbit/s, 1993.

ITU Recommendation H.263, Video coding for low bit rate communication, 1998.

ITU Recommendation H.320, Narrow-band visual telephone systems and terminal equipment, 1997.

ITU Recommendation H.323, Packet-based multimedia communications systems, Feb. 1998.

ITU Recommendation H.324, Terminal for low bit-rate multimedia communication, Feb. 1998.

Resource Description Framework (RDF) Schema Specification. http://www.w3.org/TR/WD-rdf-schema/. World Wide Web Consortium Ltd., Mar. 27, 2000.

Resource Description Framework. (RDF) Model and Syntax Specification. http://www.w3.org/TR/REC-rdf-syntax/. World Wide Web Consortium Ltd., Feb. 22, 1999.

RFC 2326 : RTSP: Real Time Streaming Protocol (RTSP), Network Working Group, Apr. 1998.

RFC 2327 : SDP: Session Description Protocol, Network Working Group, Apr. 1998.

RFC 2506 : Media Feature Tag Registration Procedure, Network Working Group, Mar. 1999.

RFC 2506 ; Media Feature Tag Registration Procedure.ftp://ftp.isi.edu/in-notes/rfc2506.txt. Internet Engineering Task Force., Mar. 1999.

RFC 2533 : A Syntax for Describing Media Feature Sets, Network Working Group, Mar. 1999.

RFC 2533 : A Snytax for Describing Media Feature Sets.ftp://ftp.isi.edu/in-notes/rfc2533.txt. Internet Engineering Task Force., Mar. 1999.

RFC 2543 : SIP: Session Initiation Protocol, Network Working Group, Oct. 1999.

RFC 2543 : SIP: Session Initiation Protocol, Network Working Group, Mar. 1999.

RFC 2703 : Protocol-independent content negotiation framework. ftp://ftp.isi.edu/in-notes/rfc2703.txt. Internet Engineering Task Force, Sep. 1999.

RFC 2705 : Media Gateway Control Protocol (MGCP), Network Working Group, Oct. 1999.

RFC 2738 ; Corrections to 'A syntax for describing media feature sets' ftp://ftp.isi.edu/in-notes/rfc2738.txt. Internet Engineering Task Force, Dec. 1999.

WAP Application Group, User Agent Profile Specifications, Nov. 1999, and Jun. 2000. Wireless Application Protocol Forum Ltd.

* cited by examiner

Symbols used in flowcharts and message diagrams

METHOD AND SYSTEM FOR IMPROVED TRANSCODING OF INFORMATION THROUGH A TELECOMMUNICATION NETWORK

CROSS-REFERENCES TO RELATED APPLICATIONS

This application is a continuation of U.S. patent application Ser. No. 10/388,375, filed on Mar. 12, 2003, which claims priority to U.S. Provisional Patent Application No. 60/364,402 filed Mar. 12, 2002, both of which are commonly assigned, and hereby incorporated by reference for all purposes.

BACKGROUND OF THE INVENTION

The present invention is related to the field of communications. In particular, the present invention is related to a method and apparatus for transcoding video and audio signals. More particularly, the invention provides a method and system for transcoding information (e.g., video, voice, data) from a first format to a destination format using a proxy transcoder server having a plurality of transcoding processes, where at least one is selected for transcoding the information. Merely by way of example, the invention is applied to a wide area telecommunication network, but it would be recognized that the invention can also be applied across many different types of multimedia protocols over transport networks such as the Internet, a mobile network, a local area network, PTSN, ISDN, SONET, DWDM, and others.

Telecommunication techniques have improved dramatically over the years. Many different types of networks such as fixed switched, packet based, wireless and mobile have been deployed. One of the most widely known world wide network called the "Internet" has popularized networking to many people around the world. An increase in use of wide area networks such as the Internet has resulted in many new on-line services such as electronic mail, video telephony, video streaming, electronic commerce, and others. Although computers originally connected to the Internet, other devices such as mobile phones, personal digital assistants, laptop computers, and the like have also been connected. Accordingly, many different types of devices now have access to many different types of services over a variety of networks.

A variety of network elements make up the networks, which connect the aforementioned devices together. Such devices are often connected by gateways and switches that handle transfer of data and conversion of messages from protocols of a sending network to protocols used by a receiving network. Gateways and switches convert analog voice messages to digital formats including G.711 and G.723.1, which are ITU standards. Gateways transmit the converted messages typically in a way similar to transmission of voice over IP. G.711 is an ITU standard for speech codecs that provides audio signals at 64 Kbps using either the A-Law PCM method or the mu-Law PCM method. G.723.1 is an ITU standard for speech codecs optimized for narrow-band networks, including Plain Old Telephone Systems and narrow band Internet connections. The standard uses the LD-CELP method and provides audio signals at 5.3 or 6.3 Kbps. Depending upon the application, there can be many others as well.

As merely an example in FIG. 1, a conventional system 100 is shown. This diagram is merely an example and provided for illustrative purposes only. A message originates from a mobile device 105, which is coupled to a wireless network. The message is sent from the mobile device to base station 110 through the wireless network. The base station is coupled to a service station 115, which is coupled to gateway 120. The base station receives the radio message from the mobile device 105, and converts the message, without transcoding, into a digital format, and transmit it to the service station 115. The reformatted message is subsequently transmitted to the gateway which in turns transmit the message to its destination, a user 140, through the Internet 125 and also through a variety of network elements. Such elements may include a gateway 130, a server 135, and others.

One or more gateways may also convert videoconferencing signals from one digital format to another, such as from H.320 to H.323, and transmit converted signals over the Internet. H.320 is an ITU standard for videoconferencing over digital lines, and it uses the H.261 video compression method, which allows H.320-compliant videoconferencing and desktop systems to communicate with each other over ISDN, switched digital lines and leased lines. H.323 is an ITU standard for real-time, interactive voice and videoconferencing over LANs and the Internet. Widely used for IP telephony, H.323 allows any combination of voice, video and data to be transported. H.323 specifies several video codecs, including H.261 and H.263, and audio codecs, including G.711 and G.723.1. Unfortunately, the audio and video standards have grown well beyond H.320, H.323, G.711, and G.723.1. That is, the proliferation of different standards has caused difficulty in communicating messages between them. Additionally, any communication between such standards has caused a proliferation of complex conversion techniques, which are time consuming and lack efficiency. Accordingly, there is a need for an efficient way to convert information or transcode between various formats in real time. Because some systems such H.320 and H.324 are circuit switched systems (data is transmitted as a continuous stream of bits) and some other systems are packet based, the connection of circuit-based to packet based systems require the demultiplexing of bits from circuit based bitstreams into packet (circuit-to-packet) and vise versa (packet-to-circuit). Note that different system protocols such as H.320, H.323, H.324, 3GPP-324M, SIP and SDP, make use of different signaling methods (to setup connections and exchange terminal capabilities). The inter-connectivity of these systems require the trans-signaling and the conversion of terminal capabilities so terminal can understand what terminals using different protocols are capable of.

From the above, it is seen that an improved way of transferring information from a source to a destination is highly desirable.

SUMMARY OF THE INVENTION

According to the present invention, improved techniques for transcoding in the telecommunication fields are provided. In particular, the present invention is related to a method and apparatus for transcoding video and speech signals. More particularly, the invention provides a method and system for transcoding information (e.g., video, voice, data) from a first format to a destination format using a proxy transcoder server having a plurality of transcoding processes, where at least one is selected for transcoding the information. Merely by way of example, the invention is applied to a wide area telecommunication network, but it would be recognized that the invention can also be applied across many different types of multimedia protocols over transport networks such as the Internet, a mobile network, a local area network, PTSN, ISDN, SONET, DWDM, and others.

In a specific embodiment, the invention provides a method and system including a specific architecture hardware for carrying out the functionality described herein. The architecture hardware is provided in Exhibit 1, which is incorporated by reference here. One or more elements of the architecture hardware can be combined with one or more elements of the functionality described in this present application. Depending upon the embodiment, there can be many modifications, variations, and alternatives.

The accompanying drawings, which are incorporated in and form part of the specification, illustrate embodiments of the invention and, together with the description, serves to explain the principles of the invention.

DETAILED DESCRIPTION OF SPECIFIC EMBODIMENTS

Figure 1:
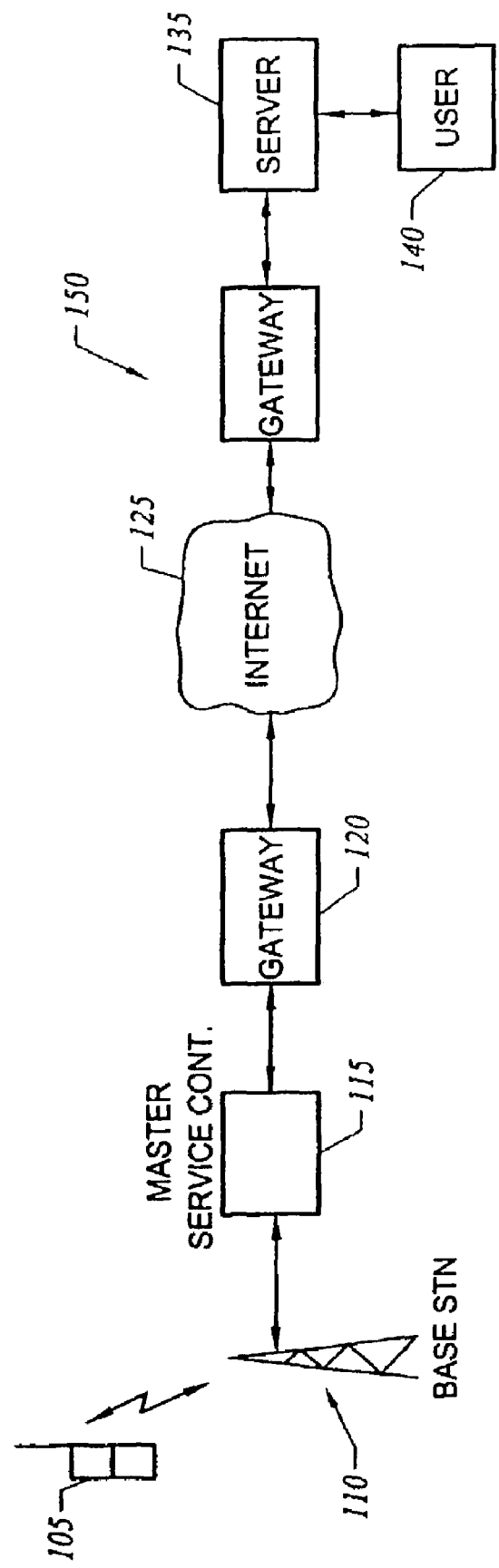
FIG. 1 illustrates a simplified block diagram of a mobile phone communicating with an end-user.

According to the present invention, improved techniques for transcoding in the telecommunication fields are provided. In particular, the present invention is related to a method and apparatus for transcoding video and audio signals. More particularly, the invention provides a method and system for transcoding information (e.g., video, audio, data) from a first format to a destination format using a proxy transcoder server having a plurality of transcoding processes, where at least one is selected for transcoding the information. Merely by way of example, the invention is applied to a wide area telecommunication network, but it would be recognized that the invention can also be applied across many different types of multimedia protocols over transport networks such as the Internet, a mobile network, a local area network, PTSN, ISDN, SONET, DWDM, and others.

Parts of the description will be presented in terms of operations performed through the execution of programming instructions according to various embodiments. As will understood by those skilled in the art, these operations often take the form of electrical, magnetic, or optical signals capable of being stored, transferred, combined, and otherwise manipulated through, for instance, electrical components. Parts of the description will be presented using a distributed computing environment. In a distributed computing environment, file servers, computer servers, and memory storage devices may be located in different places, but they are accessible to local processing units through the network. In addition, program modules may be physically located in different local and remote memory storage devices. Execution of the program modules may occur locally in a stand-alone manner or remotely in a client-server manner. Examples of such distributed computing environments include local area networks of an office, enterprise-wide computer networks, and the global Internet.

Additionally, the following terms are provided to assist the reader in explaining aspects of the invention. Such terms are not intended to be limiting but merely provided for descriptive purposes to one of ordinary skill in the art. Other meanings for the terms consistent with those understood by one of ordinary skill in the art may also be used.

| Term | Description |
| --- | --- |
| ASIC | Application Specific Integrated Circuit |
| CIF | Common Intermediate Format |
| ETSI | European Telecommunications Standards Institute |
| G.723.1 | ITU Recommendation G.723.1, Dual rate speech coder for multimedia communications transmitting at 5.3 and 6.3 kbit/s, 1996 |
| GOB | Group of blocks |
| GSM | Global System for Mobile communications |
| GSM-AMR | ETSI Adaptive Multi Rate speech coder. GSM 06.90: "Digital cellular telecommunications system (Phase 2+); AMR speech transcoding", 1998 |
| GSM-AMR | GSM- Adaptive Multi Rate |
| H.320 | ITU Recommendation H.320, Narrow-band visual telephone systems and terminal equipment, 1997 |
| H.323 | ITU Recommendation H.323, Packet-based multimedia communications systems, 1998 |
| H.324 | ITU Recommendation H.323, Terminal for low bit-rate multimedia communication, 1998 |
| H261 | ITU Recommendation H.263, Video codec for audiovisual services at p × 64 kbit/s, 1993 |
| H263 | ITU Recommendation H.263, Video coding for low bit rate communication, 1998 |
| IETF | Internet Engineering Task Force |
| ISO | International Standard Organisation |
| ITU | International Telecommunication Union |
| MB | Macro block |
| MPEG | Moving Picture Expert Group, part of the International Standard Organisation |
| MPEG2 | MPEG audiovisual standards 13818 series |
| MPEG4 | MPEG audiovisual standards 14496 (1-5) |
| MVD | Motion Vector Data |
| P Frame or P Picture | Video frame based on predicted information |
| PTS | Proxy Transcoder Server |
| QCIF | Quarter CIF (see CIF) |
| RFC | Request for Comment |
| SDP | Session Description Protocol |
| SIP | Session Initiation Protocol |
| TCOEF or TCOEFF | Transform Coefficients |
| W3C | World Wide Web Consortium |
| WAP | Wireless Access Protocol |

In a specific embodiment, the term "Proxy Transcoder Server" (herein PTS) is a computer having various modules to carryout some or all of the functionality described herein as well as other functionality, which are known or not known at this present time. The PTS comprises a host processor, one or more network interfaces, and one or more transcoders. A transcoder may contain, among others, a printed circuit board, an application specific integrated circuit (ASIC), and a field programmable gate array (FPGA). The PTS may be connected to a network host such as a media gateway controller or a soft switch or to a content server such as a video server. The PTS can provide codecs and interfaces to various network architectures and protocols, including WAN, LAN, Mobile, PTSN, ISDN, SONET, and perform one or more of the following functions:

1. Capability matching and mode selection;
2. Media bitstream transcoding;
3. Media bitstream rate control;
4. Intellectual property rights management and processing;
5. Audio data mixing; and
6. Encryption and/or decryption The overall function of the PTS is to translate between various protocols, as exemplified below.

1. Translating multimedia systems protocols, including the ITU H.32X series, e.g., H.242 and H.245, which are used for conveying the media capabilities of end-points, and managing media channels and conferences.

2. Translating media streams including audio and video streams, e.g., translating video streams to and from any pair of video codecs including MPEG2, MPEG4, H.261, H.263, or audio streams to and from any pair of audio codecs including G.723.1, G.729, GSM-AMR, EVRC, SMV, and QCELP.

3. Translating IP management protocols and IP rights markings. For example, the PTS may extract IP rights information from MPEG4 streams and process the information in accordance with IP rights-related operations in order to maintain the IP rights in the media.

4. Encrypting and/or decrypting signals if necessary.

Hence, the PTS has a variety of audio and video transcoding capabilities. Selection of capabilities affects overall qualities of service (QoS) in multimedia communication, and should therefore be determined based on the connection bandwidth and load of the gateway to which the PTS is coupled. The PTS can transcode for different media contents including MPEG series, H.26X video series, GSM-AMR, and G.72X audio codec series. Furthermore, the PTS' transcoding capabilities can be easily upgraded, at least in part due to its programmability.

In addition, the PTS can perform media bitstream rate control. The rate control is necessary because the connection between two end-points may involve bandwidth reduction, e.g., from wired to wireless network. The PTS may perform rate control using information from network channel allocation as supplied by the network access provider, or using in-band bandwidth management requests, which can be originated from end-points through command and control protocols, e.g., H.242 and H.245.

Moreover, the PTS can perform intellectual property (IP) rights management and processing. For example, the PTS may identify a data set regarding intellectual property rights, and use it to facilitate the management and processing. In one embodiment, MPEG4 supplements coded media objects with an optional intellectual property identification (IPI) data set, which carries information on contents, types of contents, and IP rights holders. The data set, if present, forms part of an elementary stream descriptor describing streaming data associated with a media object. The number of data sets associated with each media object may vary; and different media objects may share the same data set. The provision of the data sets allows the implementation of mechanisms for audit trail, monitoring, billing, and copy protection.

Multimedia communication applications have wide ranges of requirements for IP rights protection and security. Some applications require protecting information that users exchange in order to preserve privacy, even if the information has no intrinsic value. Other applications require high-grade management and protection for information of importance to its creator and/or distributors. In addition, the framework of IP rights management and processing must generally be flexible so as to access various forms of IP rights data, as required by a specific application, and as stored in a particular bitstream.

Although the description that follows shows a PTS connected to a gateway as a stand alone device, alternate embodiments of the PTS may use a PTS connected to a switch, a server, a router or any device connected to a network. In addition, a PTS may be integrated into a gateway, a switch, a router or other device connected to a network to form an integral part of that network device. Further details of other embodiments are provided below.

Figure 2:
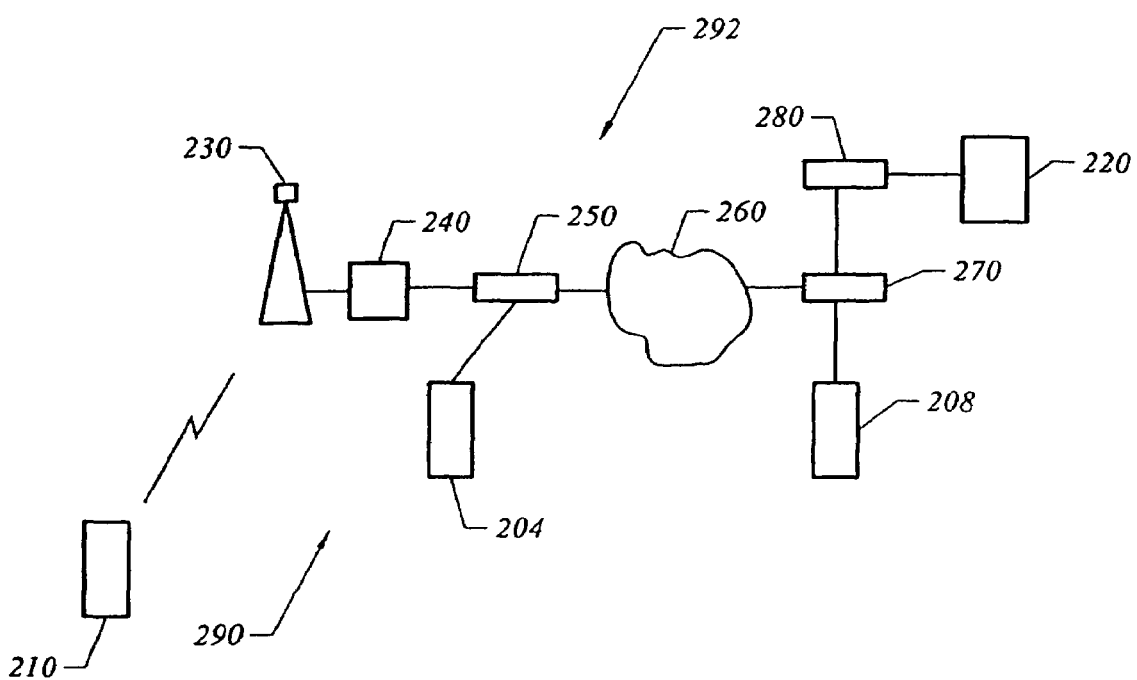
FIG. 2 illustrates one embodiment of the operation of proxy transcoder servers.

FIG. 2 illustrates an embodiment wherein a PTS transcodes signals between a mobile end-point and a LAN phone. This diagram is merely an example, which should not unduly limit the scope of the claims herein. One of ordinary skill in the art would recognize many other variations, modifications, and alternatives. A mobile end-point 210 communicates audio and video information with a LAN phone 220. The transmitted information travels from the mobile end-point 210 to a Base Station 230 via a radio communication channel, e.g., an air link, and subsequently to a Master Service Controller 240, to a near-end gateway 250, through the Internet 260, to a far-end gateway 270, to a LAN switch 280, and finally to the LAN phone 220.

Because of limitations of an air-link and mobility of the mobile end-point 210, the bandwidth between the mobile end-point 210 and the base station 230 may reach several tens or hundreds of Kbps, much smaller than the bandwidth between Internet routers and the LAN phone 220. The latter bandwidth reaches 10s to 100s of megabits per second (Mbps). In FIG. 2, the media coding and decoding capability of the mobile end-point 220 is GSM-AMR for audio signals and MPEG-4 for video signals. In contrast, the media coding and decoding capability of the LAN phone 230 is G.723.1 for audio and H.263 for video. The differences in capability and bandwidth make important transcoding performed by PTS in the path between the mobile end-point 220 and the LAN phone 230, to facilitate substantially real-time communications. In addition, transcoding by PTS prevents overloading a mobile network 290, because the PTS performs a throttling function.

In FIG. 2, audio signals need to be transcoded between G.723.1 and GSM-AMR, while video signals need to be transcoded between MPEG4-video and H.263. Such transcoding may be performed by either a PTS 204 in the mobile network 290 or a PTS 208 in a landline network 292. Thus the two PTS's 204 and 208 are not necessary to perform the transcoding. But implementing one PTS in each network allows the bandwidth requirement at each gateway to become smaller. In addition, even though the embodiment illustrated in FIG. 2 shows transcoding by PTS, the PTS's can also allow transmission of signals without transcoding.

Figure 3:
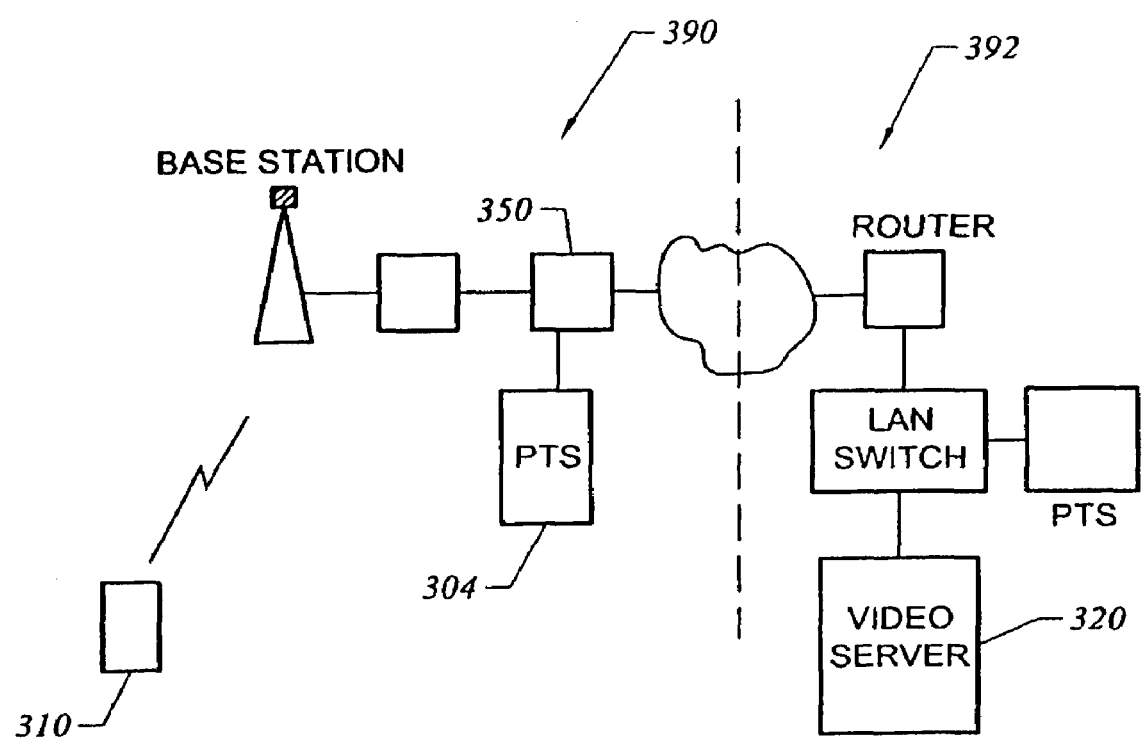
FIG. 3 illustrates another embodiment of the operation of proxy transcoder servers.

FIG. 3 illustrates a block diagram of yet another embodiment of the present invention. This diagram is merely an example, which should not unduly limit the scope of the claims herein. One of ordinary skill in the art would recognize many other variations, modifications, and alternatives. A mobile handset 310 communicates information with a video content server 320. The video server 320 streams movies containing audio and video signals. The audio signals are encoded using MPEG2-Audio Level 3 (MP3) and the video signals are encoded using MPEG2-video. Due to the mismatch in bandwidth and capability between the video server 320 and the mobile handset 310, the PST 304 in a mobile network 390 would transcode the audio to GSM-AMR and the video to MPEG4-video. But if the PST 308 in a video server network 392 performs the transcoding, the bandwidth requirement for a gateway 350 in the mobile handset network 390 may be reduced.

In yet another embodiment, the capabilities of two end-points of communication may be specified using Wireless Access Protocol (WAP) User Agent Profile information (Capabilities and Preferences Information), the web consortium CC/PP (using the Resource Description Framework, or RDF), the IETF standards (RFC 2506, RFC 2533, and RFC 2703) or ITU's H.245 or H.242 standards, or a combination thereof. In yet another embodiment, a gateway may, under the assistance of PTS, detect the capabilities of end-points and the bandwidth available or allocated for transmission of media. The PTS may then select a data coding mode and transcode the media to best meet the requirements of the end-points. Hence, the PTS may serve as a proxy for each end-point side, converting bitstreams in one form appropriate for one side to another form appropriate for the other side.

Figure 4:
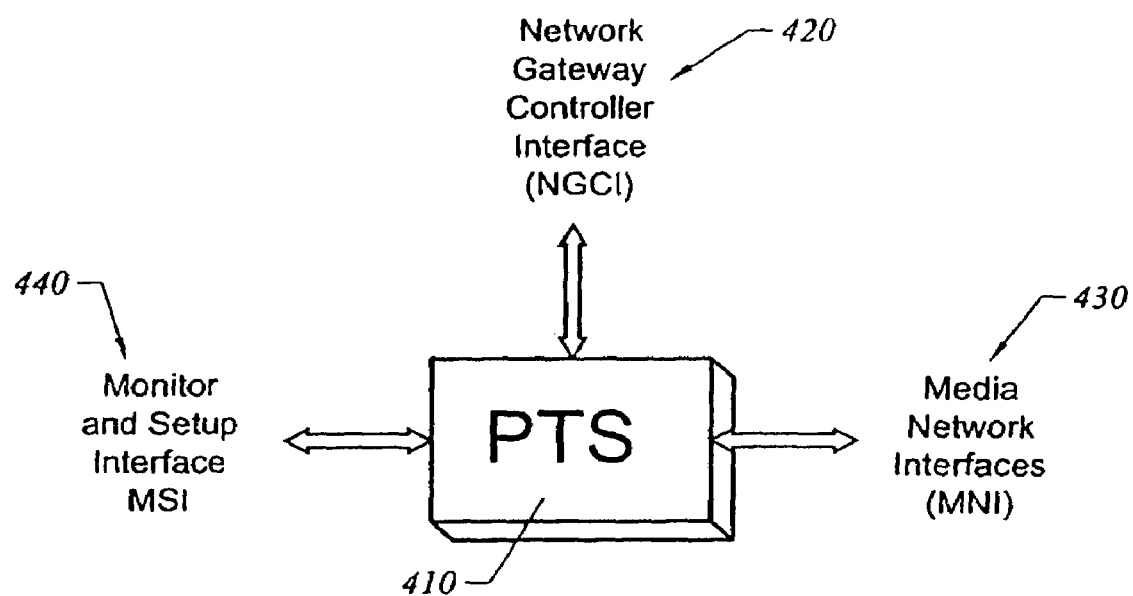
FIG. 4 is a simplified block diagram illustrating one embodiment of the connectivity of the proxy transcoder server.

FIG. 4 illustrates a block diagram of an PTS according to an embodiment of the present invention. This diagram is merely an example, which should not unduly limit the scope of the claims herein. One of ordinary skill in the art would recognize many other variations, modifications, and alternatives. Logical ports are defined as abstract communication ports. Several logical ports may exist on one physical network interface, but a PTS may have more than one physical network interface. A network gateway controller interface (NGCI) 420 may comprise at least one NGCI logical port for messaging between a PTS 410 and a gateway or a network host. The gateway may perform call signaling between end-points. The gateway may be a media gateway controller, or any other gateway device that establishes call or transport function between end-points. Call signaling is the process of establishing the initial link between end-point entities, by exchanging network addresses of the source and the destination of a media stream to be transcoded. For real-time Internet protocol, call signaling establishes Internet protocol addresses and Internet protocol port numbers for the source and the destination of a media stream. Call signaling could also involve more sophisticated processes, such as that required by SIP or H.323.

Media network interfaces (MNI) 430 provide logical ports for reception and transmission of media bitstreams. Through these logical ports, the PTS 410 receives media bitstreams, e.g., audio signals, video signals, command and control data, and other data that could be text or binary. Port addresses for receiving bitstreams by the PTS 410 and the destination addresses to which the transcoded streams are transmitted are specified by a messaging protocol between the call signaling gateway and the PTS 410 through the NGCI 420. The underlying physical interface of the MNI 430 could be a Gigabit network interface card, time domain multiplexed (TDM) circuit-switched connections such as E1/T1/OC3. The MNI 430 physical network interfaces may or may not share the physical link of the NGCI 420.

A monitor and setup interface (MSI) 440 is used for initial configuration, monitoring, and reconfiguration of the PTS 410. The physical link over which the MSI data are carried may be shared with other network connections or may be carried through a dedicated serial connection port. Many connectivity scenarios exist for a PTS, including connecting to a gateway e.g., a media gateway controller, and connecting to a content server, e.g., a video server.

Figure 5:
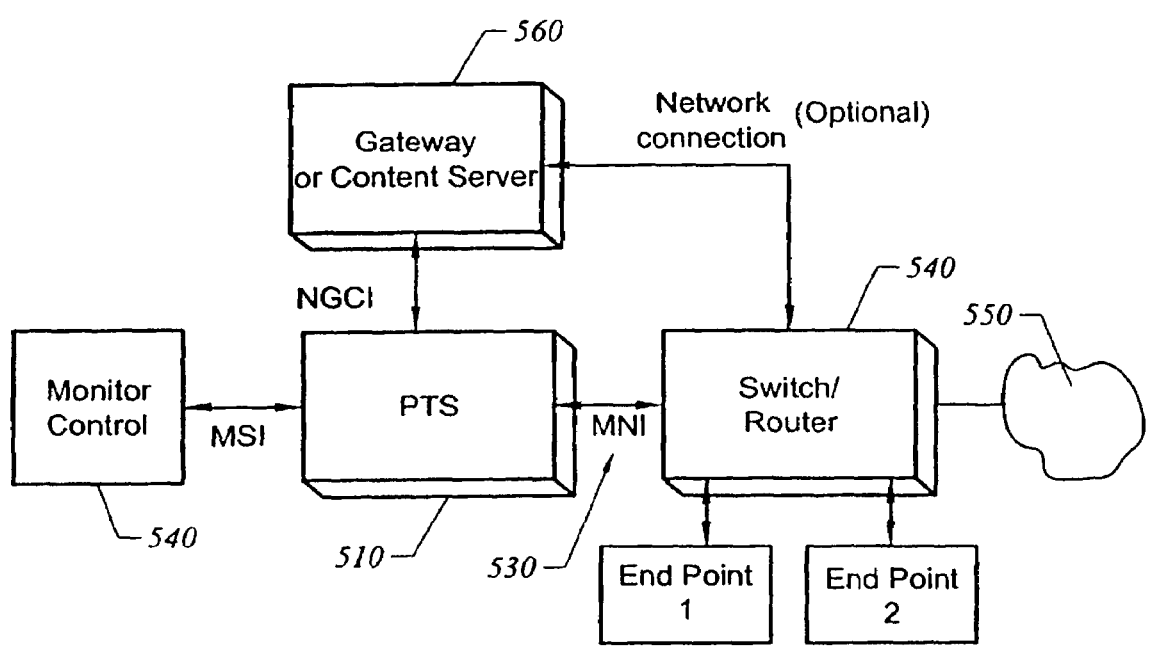
FIG. 5 is a simplified block diagram illustrating an embodiment of a proxy transcoder server connected to a gateway.

FIG. 5 illustrates the connectivity of a PTS according to an embodiment of the present invention. This diagram is merely an example, which should not unduly limit the scope of the claims herein. One of ordinary skill in the art would recognize many other variations, modifications, and alternatives. A MNI 530 connects a PTS 510 to the Internet 550, via a router or switch 540, and a NGCI connects the PTS 510 to a content server (or gateway 560 can be a gateway mediating between two end-points, e.g. a mobile and an IP phone) 560 via the NGCI 520. The MSI 530 may also in connection to the content server 560 if the content server can provide basic terminal emulation support, e.g., hyper-terms under Windows. In one embodiment, the gateway or content server may be a network host.

Figure 6:
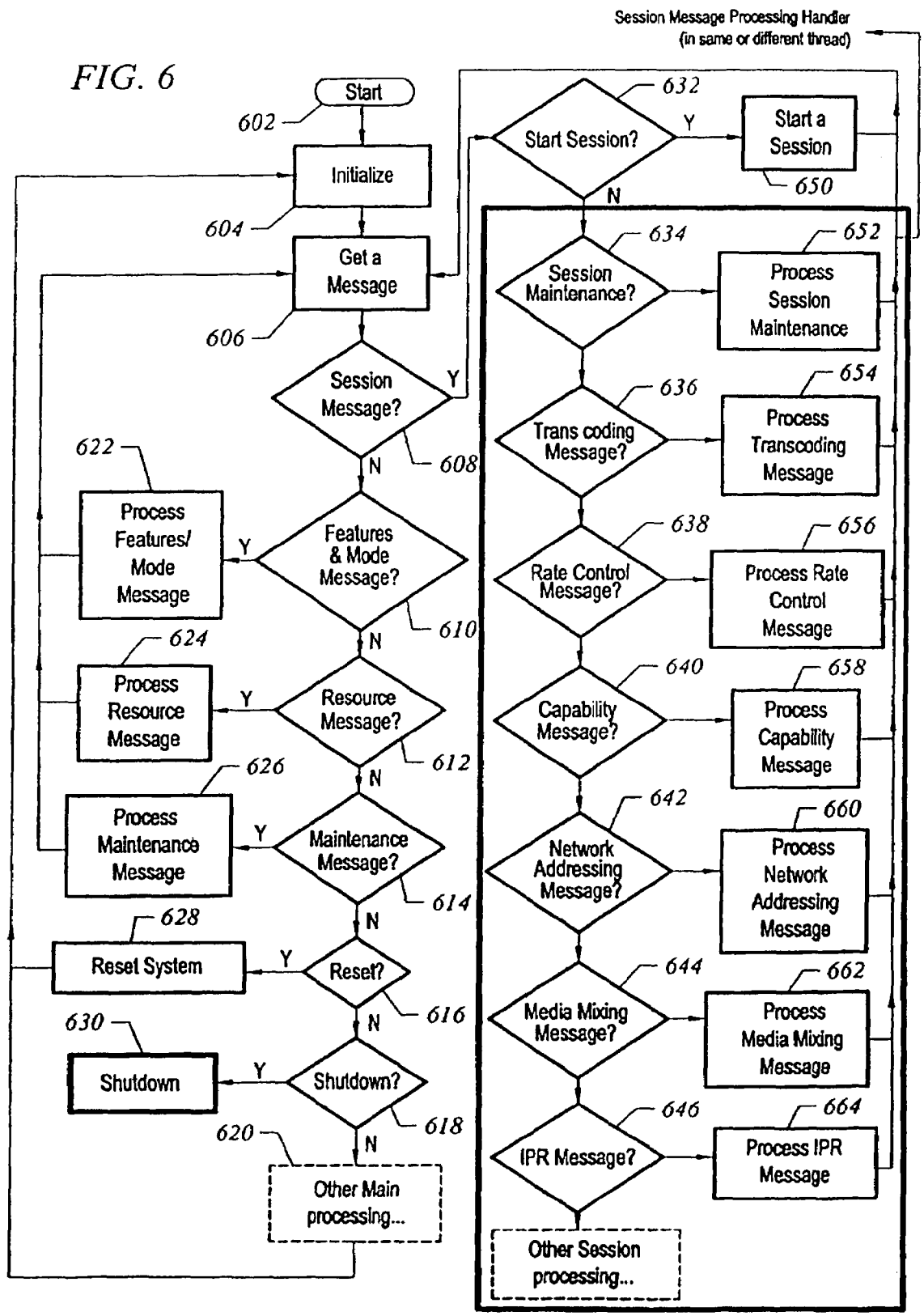
FIG. 6 is a simplified flow diagram illustrating one embodiment of the transcoding process.
Figure 7:
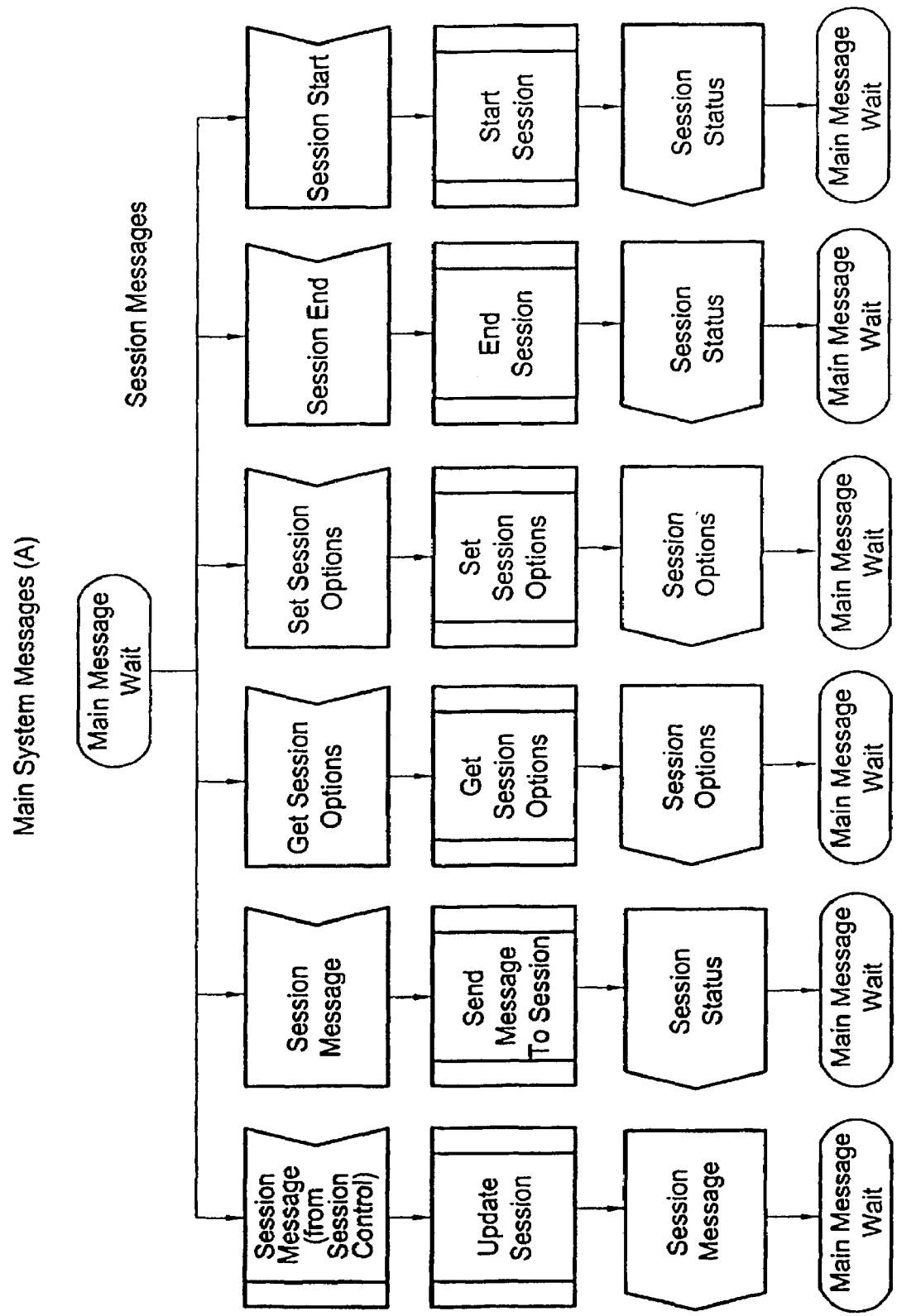
FIG. 7 is a simplified flow diagram illustrating one embodiment of the main system messages.
Figures 8, 9:
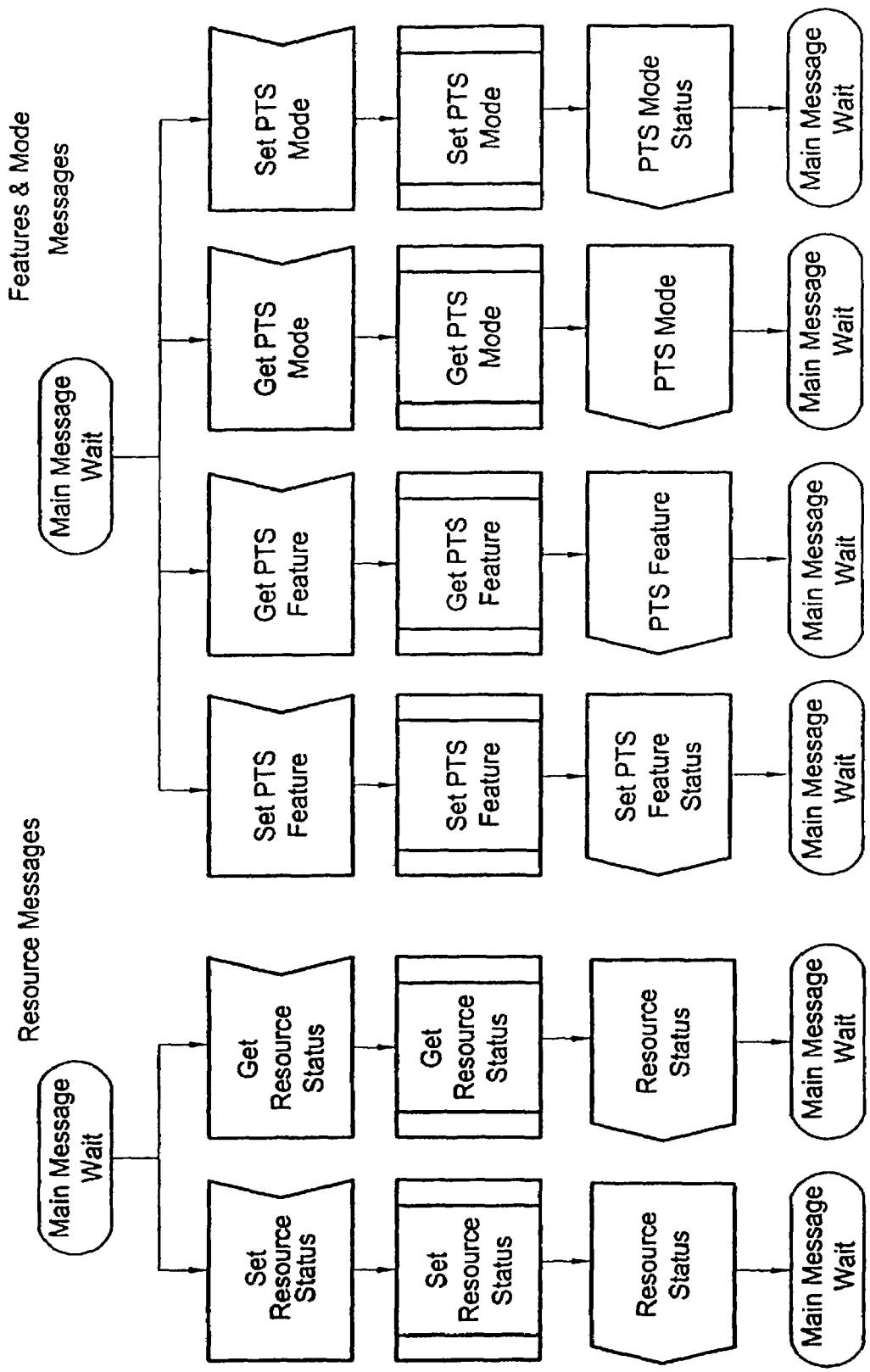
FIG. 8 is a simplified flow diagram illustrating one embodiment of the resource messages.
FIG. 9 is a simplified flow diagram illustrating one embodiment of the PTS features and mode messages.
Figure 10:
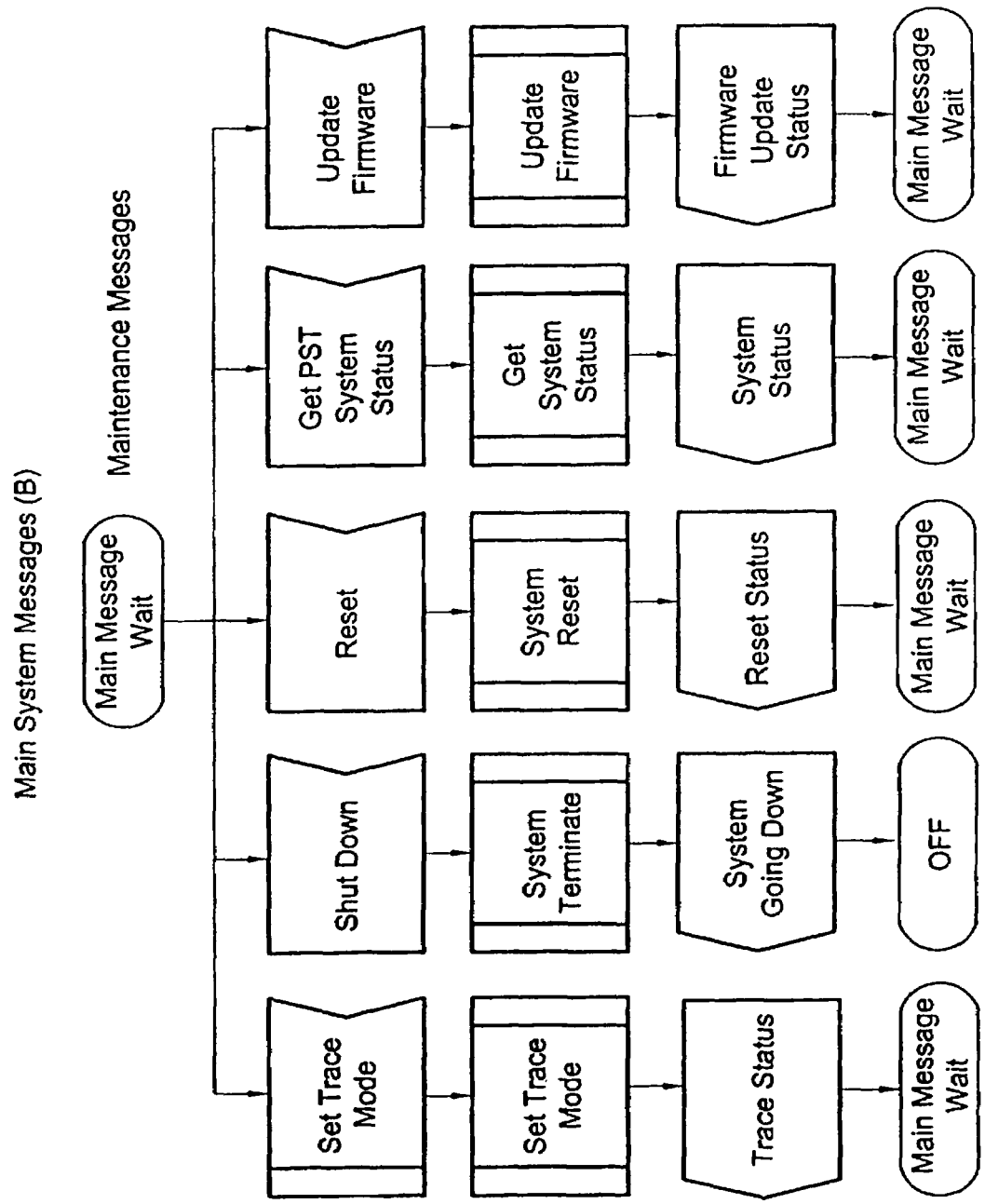
FIG. 10 is a simplified flow diagram illustrating one embodiment of the PTS maintenance messages.
Figure 11:
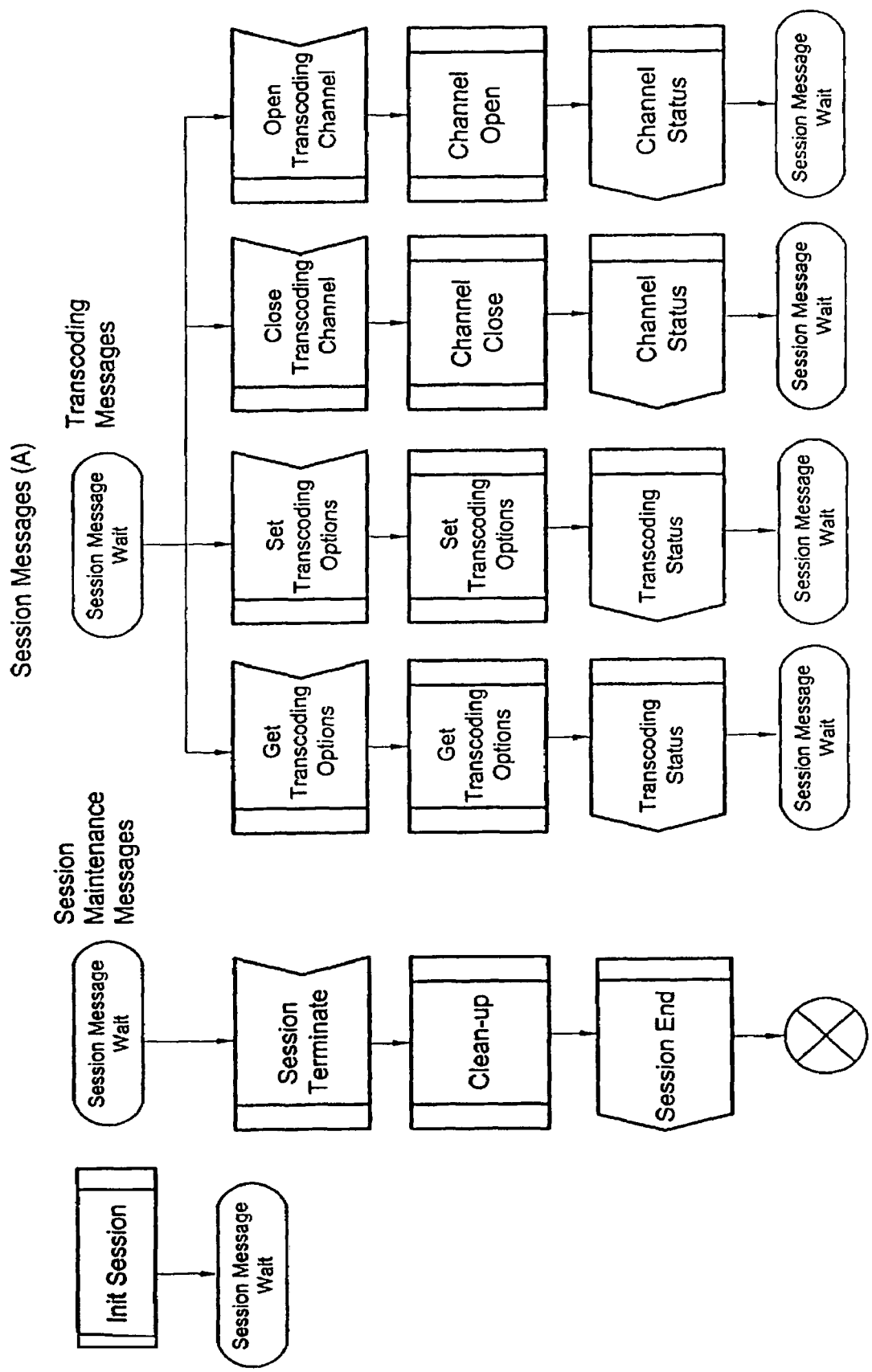
FIG. 11 is a simplified flow diagram illustrating one embodiment of the PTS session maintenance and transcoding messages.
Figure 12:
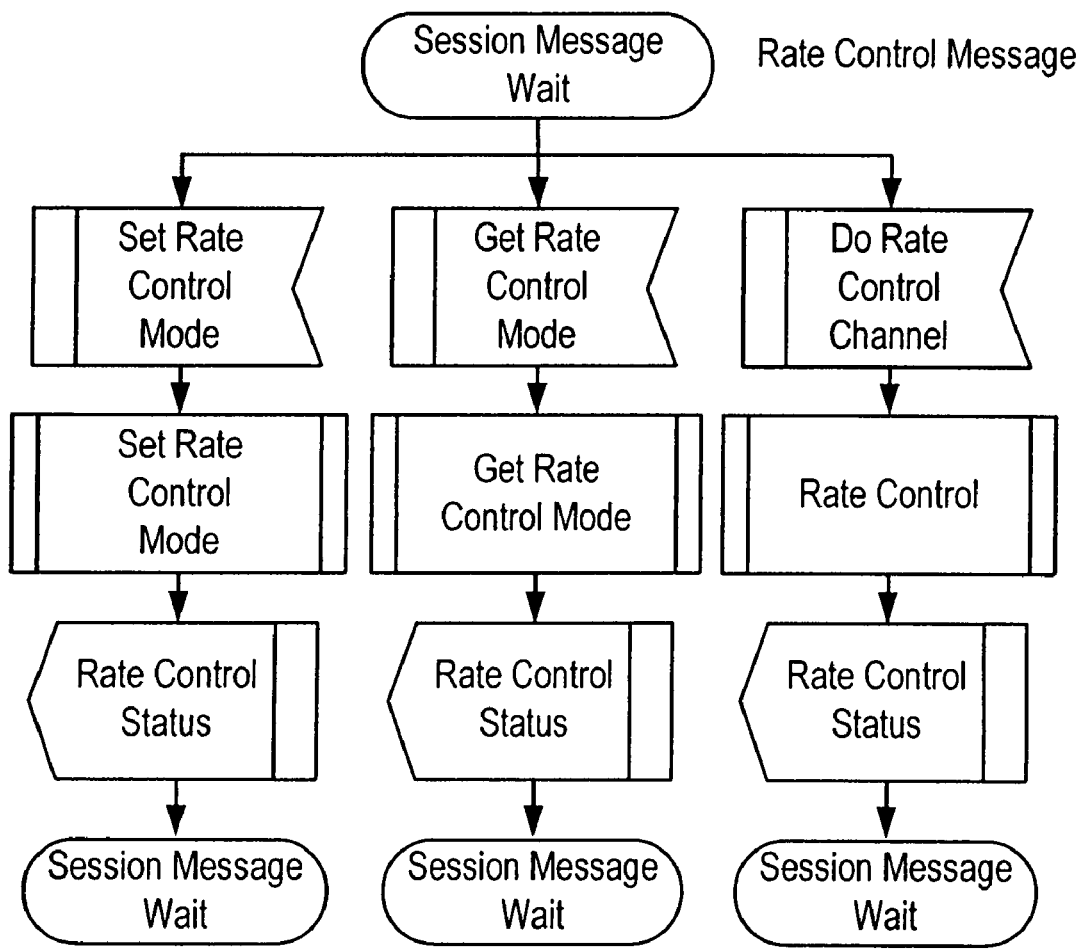
FIG. 12 is a simplified flow diagram illustrating one embodiment of the PTS session rate control messages.
Figure 13:
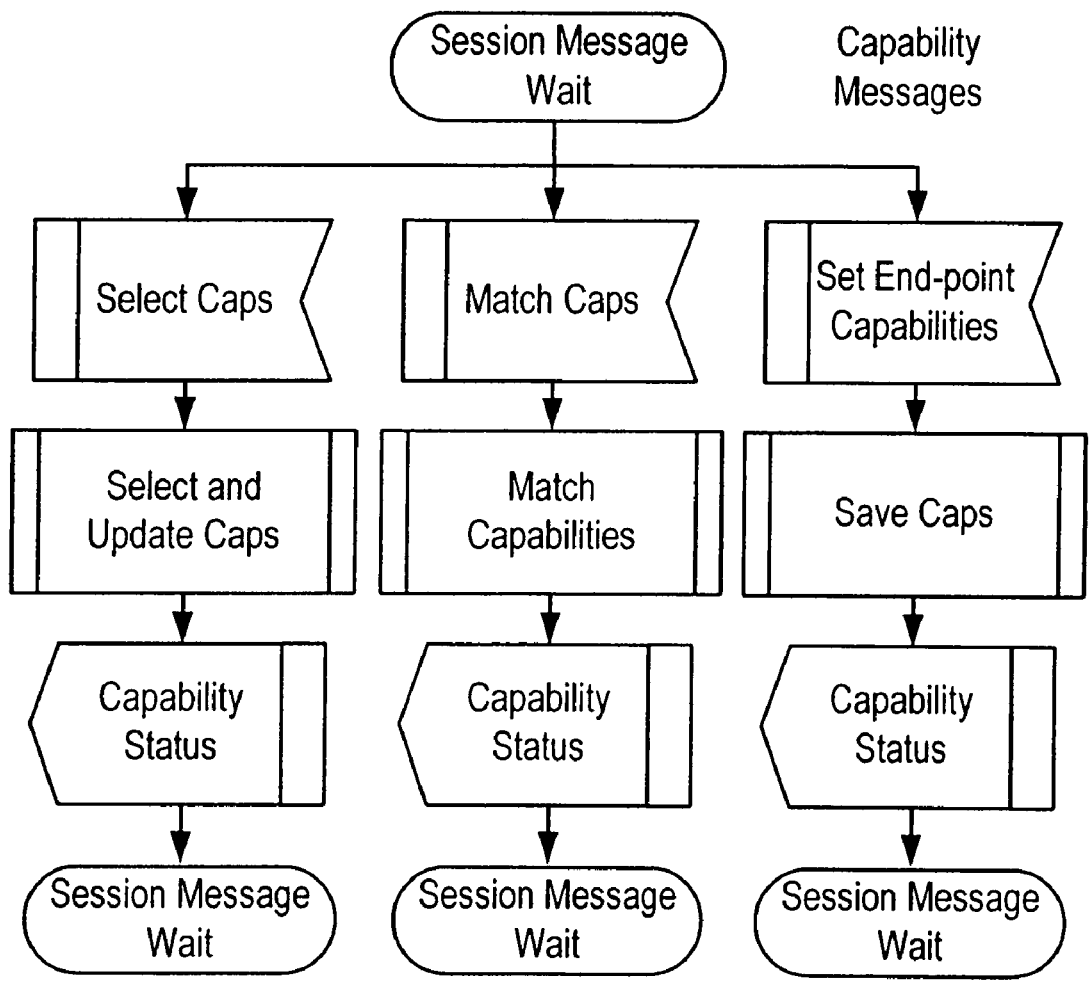
FIG. 13 is a simplified flow diagram illustrating one embodiment of the PTS session capability messages.
Figure 14:
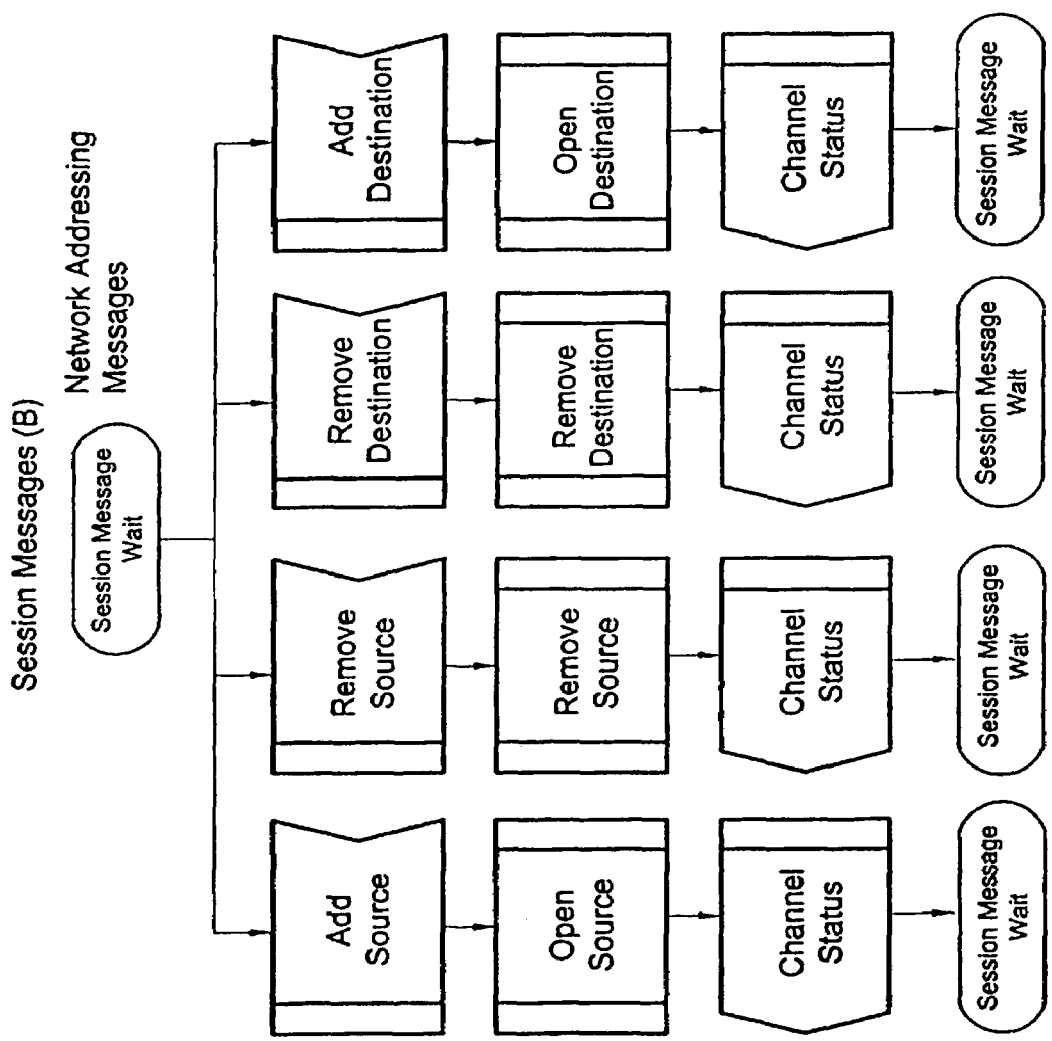
FIG. 14 is a simplified flow diagram illustrating one embodiment of the network addressing messages.
Figures 15, 16:
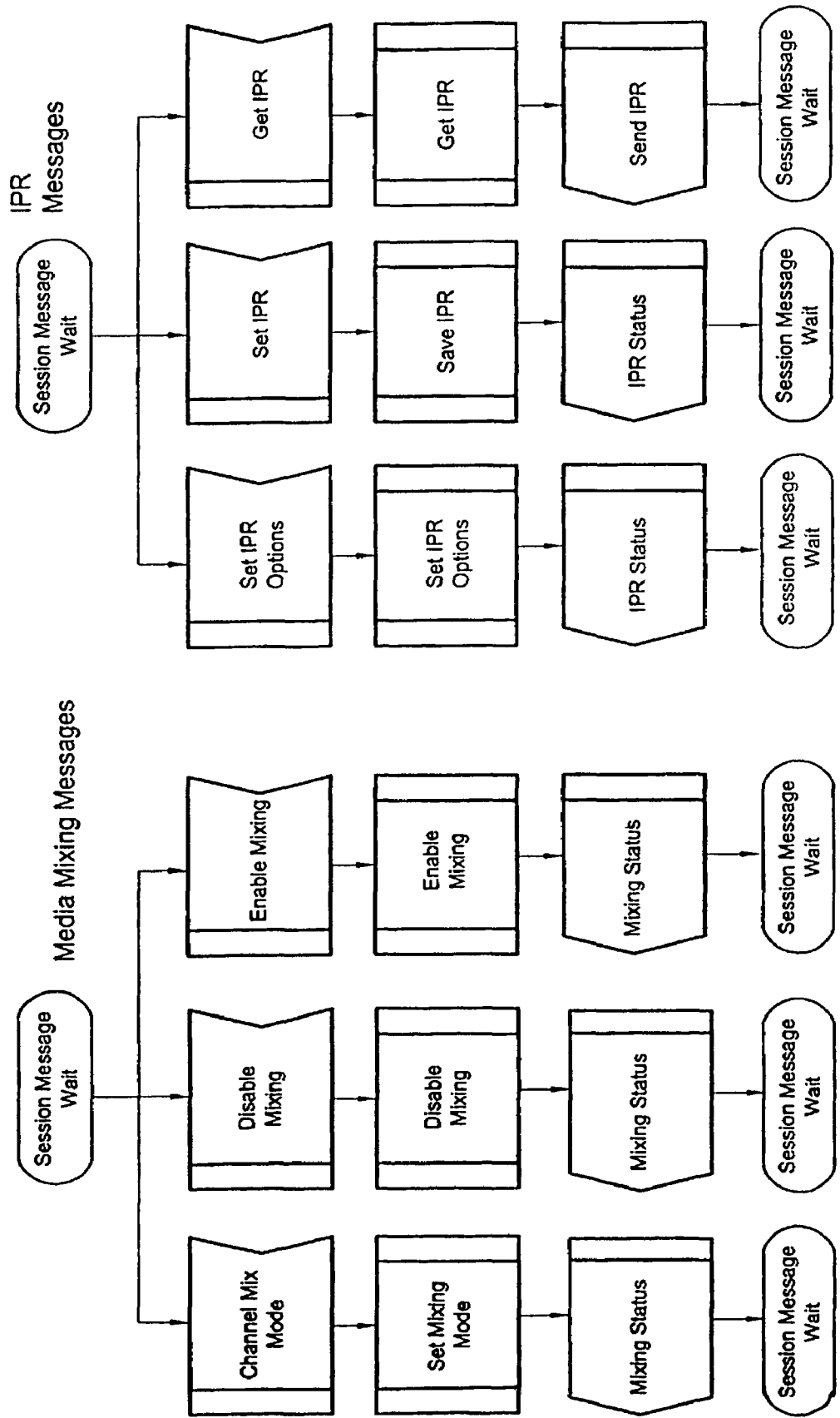
FIG. 15 is a simplified flow diagram illustrating one embodiment of the PTS media mixing messages.
FIG. 16 is a simplified flow diagram illustrating one embodiment of the PTS IPR messages.

FIG. 6 illustrates various PTS functions the means of an operation cycle according to an embodiment of the present invention. This diagram is merely an example, which should not unduly limit the scope of the claims herein. One of ordinary skill in the art would recognize many other variations, modifications, and alternatives. Once a PTS is connected to the network, e.g., a network host or a router, and is powered-up and configured, the PTS is ready to accept the initiation of transcoding sessions from the network host.

At step 606, the PTS receives a message from either a gateway or from a content server. At step 608, the PTS determines if the received message is a session message. If the message is a session message, at step 632, the PTS decides if the message is a start of session message. A session may be initiated by a network host through a messaging protocol operated over the NGCI, such the MGCP or the H.248/MEGACO protocols. One or more sessions can be active at any time. Once a session is started, basic operations of the PTS for that session are controlled by further messages.

If the message received is a start of session message, at step 650, the PTS starts a new session. If the received message is not a start of session message, at step 634, the PTS decides whether the received message is a session maintenance message. If it is a session maintenance message, the PTS commences a session maintenance process at step 652. The session maintenance process may involve maintaining or terminating a connection for a session. If the received message is not a session maintenance message, at step 636, the PTS decides whether the received message is a transcoding message. If the message is a transcoding message, at step 654, the PTS processes the transcoding message. If the message is not a transcoding message, at step 638, the PTS determines whether the received message is a rate control message. If the received message is a rate control message, at step 656, the rate control message is processed. The rate control process may direct the PTS to dynamically adjust the transmission rate in order to efficiently utilize the transmission bandwidth and to prevent transmitted packets from being dropped.

When the PTS transcodes a bitstream, the optimal data rate produced by the PTS depends on media protocol of the network between the PTS and the destination of the bitstream. The data rate received by the destination varies, depending on network congestion, type of link between a router and the destination, e.g., wired connection or wireless connection, protocol and data multiplexing associated to the link, and the quality of the link. The destination may receive a data rate higher than it can process, resulting in buffer-overflow. On the other hand, the destination may receive a date rate lower than the rate it expects to receive, resulting in buffer-underflow. Therefore, the PTS may have to regulate its data rate to avoid both buffer-overflow and buffer-underflow.

The PTS regulates its data rate with at least the following methods. The PTS may use network congestion information, bandwidth information, quality information from the network host or the network access provider, or from internal PTS mechanisms to calculate roundtrip time. The roundtrip time between the PTS and an end-point, e.g., source or destination of a bitstream, can be measured by sending a "ping" packet to the end-point. The total time for the "ping" packet to reach the end-point and for the response packet from the end-point to reach the PTS is the roundtrip time. The more congested the network is, the longer is the roundtrip time. Hence the roundtrip time can be used to assess the congestion level of the network at current PTS bit-rate.

Alternately, the PTS may assess the network congestion using in-band information. For example, the PTS may receive from an end-point, instructions to reduce or to increase its bit-rate throughput, under protocols such as H.245 used in H.324 and H.323.

Either the in-band method or the roundtrip-time method may be used to maintain adequate quality of service given instantaneous network conditions. The PTS uses the congestion and bit-rate information to determine an adequate coding mode that yields an appropriate bit-rate with the following methods.

In one embodiment, the PTS may change transcoding parameters to satisfy service goals in real-time operation. For example, in MPEG4-video, the quantization parameters can be changed to yield a low bit-rate throughput. But the change may lead to degradation in video quality. Therefore if video quality is important, advanced coding techniques such as that provided by H.263 and MPEG4 may be used to reduce the bit-rate throughput without degrading quality. But these methods may impose higher computation requirements. Hence, the PTS rate control strategy should provide a desired balance between signal quality, bit-rate and computation.

The rate control in audio is achieved similarly although most audio codecs cannot provide fine-grained variable rates, but instead provide a number of bit rates that the PTS can select from. For example, the G.723.1 audio codec provides two bit-rates, a low rate and a high rate. Similarly, the GSM-AMR codec supports eight bit-rates, ranging from 4.75 Kbps to 12.2 Kbps. The PTS may use a lower rate if the network path to the end-point has congestions, or if the bandwidth allocated to the link with the end-point has a low bandwidth.

In yet another embodiment a PTS may instruct the network equipment such as a router to give a higher priority to the data being handled by the PTS, if the network equipment supports prioritization of data delivery. For instance, version 6 of the Internet protocol provides support for prioritization of packets. Also, the IETF has developed standards for resource reservation that allows end-points to reserve bandwidth. The PTS may exploit this packet prioritization and resource reservation if they are supported by network in which the PTS is being deployed. For example, the Internet protocol provides facility for assigning priority to packets, and the PTS can use this facility to prioritize packets when needed. In addition, the PTS may support internal prioritization of its own connections so connections of higher priority are processed as soon as they become practical.

Turning back to FIG. 6, at step 640, the PTS determines whether the message received is a capability message. A capability message is a message that contains capabilities of the end-points. If the message is a capability message, at step 658, the PTS processes this message. The PTS can process the message defining capabilities of end-points. For example, if the end-points are a video server and a mobile terminal, the capabilities of the video server and the mobile terminal are conveyed to the PTS. Consequently, the PTS determines the best mode of communication between these two end-points. In choosing the best mode, the PTS takes into account the protocol associated with the specific video content that the mobile user would like to view. Different types of contents may be encoded with different protocols, e.g., MPEG2 and MPEG4. In addition, the capabilities of the mobile terminal may be communicated to the PTS via the network host in numerous ways. For example, the PTS may obtain the capabilities from information stored in the mobile terminal, from the user subscription information stored in the network database of the user's service provider, or in-band within the bitstream exchanged between the mobile terminal and the network access gateway during the call signaling phase. The format of the capabilities includes among others ITU, IETF, and WAP.

A capability message may be sent by the network host to the PTS to find the best transcoding mode for a specific media to be transmitted from one end-point, e.g., a video server, to the other end-point. In the capability-mode-selection process, the PTS may choose one bitstream protocol mode for receiving data from the source, and another bitstream protocol mode to which the PTS convert the received media.

In yet another embodiment, the selected modes for each end-point may be signaled to the respective end-point in order to open bitstream transport channels. In H.323 or H.324, the network uses H.245 logical channel operations or Fast Connect procedures to open such channels. Using H.245 logical channel operations, an end-point may send an "open logical channel" request to the other end-point in order to transmit signals. In H.323, an end-point can encapsulate information about media channels through which the end-point is ready to transmit signals by using a "fast start" message encapsulated in the call signaling information, exchanged in the initial setup of the call under, for example, the ITU Q.931 standard as recommended by H.225.0. Therefore, given the selected protocols for the end-points, the network host or the PTS can establish transport channels for a media bitstream. The opening process depends on the system level protocol of the overall connection between the end-points mediated by the network.

Before the PTS can transcode, the selected media transmission modes have to be associated with a source address and a destination address, and the information of such association has to be communicated to the PTS via messages. The association may result from opening a logical media channel by one of the end-points as done in the H.245 standard. This implicit opening of a logical media channel when the PTS selects the types of media transmission modes can be explicitly requested by the gateway or the content server, or could be pre-programmed under some standard requirements. Regardless of the means for specifying the source address or the destination address, the association between selected media transmission modes and the source or destination addresses informs the PTS where to get the input bitstream and where to send the transcoded bitstream.

In a specific embodiment, the PTS reads the bitstream from the source address, translates the bitstream from its original format to the target format, and sends the converted bitstream to the destination address. The reception and transmission of bitstream data is performed with network read/write functions, using the network hardware-specific software.

Turning back to FIG. 6, at step 642, the PTS determines whether the message received is a network-addressing message. A network-addressing message contains information about network addresses for the source and/or the destination of a bitstream. If the message received is a network-addressing message, at step 660, the PTS processes the network-addressing message. At step 644, the PTS determines whether the message received is a media-mixing message. A media-mixing message is a message requesting the PTS to mix signals associated with two or more audio streams and retransmit the mixed bitstreams to a network destination address. If the received message is a media-mixing message, at step 662, the PTS processes the media-mixing message. At step 646, the PTS determines whether the message received is a IP rights message, and if so at step 664 the PTS manages the information regarding IP rights contained in the received message, according to instructions in the message. Some media communication and representation protocols support interfacing with IP rights management and processing, and accessing information regarding IP rights contained in bitstreams. For example, the PTS may support the MPEG-4 interface specification for IP rights management and processing. The information regarding IP rights is extracted or demultiplexed from MPEG4 bitstreams and made available to the network host via the messaging system. The IP rights specific applications installed on the network host or plugged into the PTS then access and process such information for various purposes, including record keeping, resigning of the content, and blocking.

At step 610 in FIG. 6, the PTS determines whether the received message is a features and mode message and if so, at step 622, the PTS processes this message. Processing a features and mode message includes activating features and options that are related to transcoding, mixing and other options associated to the session. At step 612, the PTS determines whether the received message is a resource message, and if so, at step 624, the PTS processes this message. Processing a resource message includes processing the PTS resources in terms of hardware processing resources, memory resources, and other computing or networking resources that the PTS manages. If the PTS receives instructions that the media being received and thereafter transmitted needs to be encrypted, the PTS transcodes and thereafter encrypts the transmitted data. Similarly, the PTS may decrypt data in response to instructions received.

In the above, the capabilities of the PTS are illustrated as discrete steps, but one skilled in the art will appreciate that one or more of the discreet steps may be combined or further subdivided to perform functions of the discreet steps. Depending upon the embodiment, the functionality described can be separated or even combined. The functionality can be implemented in software and/or hardware including any combination of them. Depending upon the embodiment, there can be many other modifications, variations, and alternatives.

FIGS. 7, 8, 9, and 10 are simplified flow diagrams illustrating an embodiment of the main system messages. These diagrams are merely examples, which should not unduly limit the scope of the claims herein. One of ordinary skill in the art would recognize many other variations, modifications, and alternatives. The main system messages allows the PTS to respond to instructions from a network equipment such as a media gateway controller. The messages includes instructions to start a session, end a session, set session options, get session options, send a message to session manager, get message from session manager, set PTS mode, get PTS mode, set PTS feature, get PTS feature, get resource status, set resource status, update firmware procedure, get PTS system status, reset the PTS, shutdown the PTS, and activating debug/tracing mode.

FIGS. 11-16 are simplified flow diagrams illustrating an embodiment of the PTS session maintenance and transcoding messages. These diagram are merely examples, which should not unduly limit the scope of the claims herein. One of ordinary skill in the art would recognize many other variations, modifications, and alternatives. The session maintenance and transcoding messages allow the PTS to terminate a session, open/close transcoding channel, set/get transcoding options, updating end-point capabilities, match end-points capabilities, select end-point capabilities, activate rate control, get rate control mode, get rate control mode, add/remove media destination addresses, add/remove media source addresses, set/get IPR modes, set IPR options, activate mixing of media channels, disable mixing, and set channel mixing mode.

Figure 17:
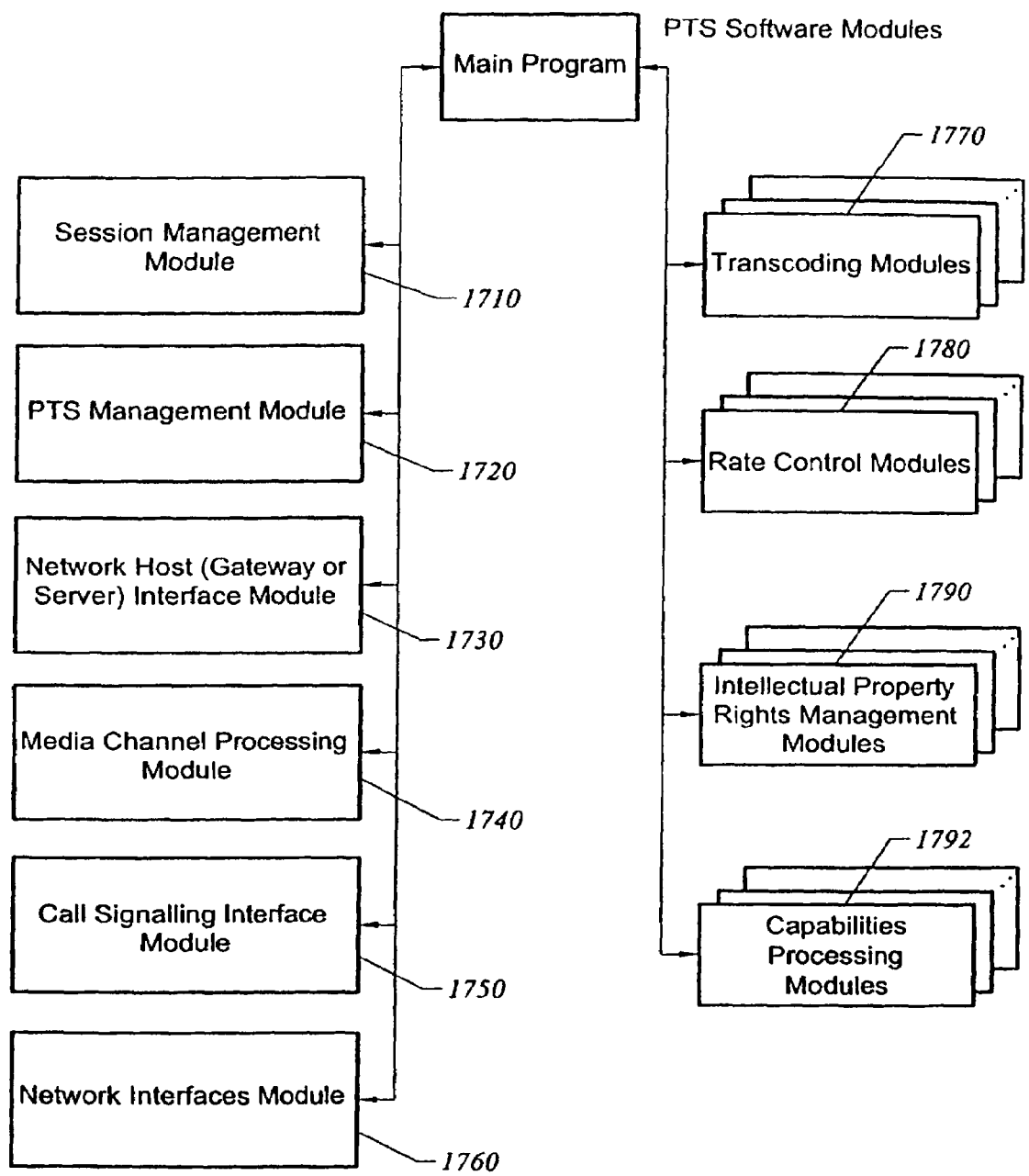
FIG. 17 is a simplified flow diagram illustrating one embodiment of the PTS software modules.

FIG. 17 shows a block diagram illustrating software modules that may be used in a PTS according to an embodiment of the present invention. This diagram is merely an example, which should not unduly limit the scope of the claims herein. One of ordinary skill in the art would recognize many other variations, modifications, and alternatives. The PTS software comprises the following main modules:

1. A session management module 1710;
2. A PTS management module 1720;
3. A network host interface module 1730;

4. A media channel processing module 1740;
5. A call signaling interface module 1750;
6. A network interface module 1760;
7. A transcoding module 1770;
8. A rate control module 1780;
9. An intellectual property rights management module 1790; and
10. A capabilities processing module 1792.

The session management module 1710 performs the main services of a gateway, and is thus the main PTS software program. For example, the session management module 1710 starts and ends transcoding sessions, handles and dispatches session messages, and manages session resources. The PTS management module 1720 performs basic overall management functions necessary if an operator needs to inspect the status of the PTS or to manage its resources. For example, the management module 1720 tests main hardware components with component specific testing procedures, resets the PTS, and tracks and allocates transcoding resources dynamically. The network host interface module 1730 handles communication-messaging interface between the PTS and the network host, e.g., a media gateway controller or a content server. For example, the interface module 1730, depending on type of network host, implements messaging between the network host and the PTS, implements commands defining methods by which transcoding capabilities are captured by the PTS or defined for the PTS. In addition, the interface module 1730 may implement methods by which the PTS retrieves media content types from bitstreams when capability exchanges are not explicitly performed. The media channel processing module 1740 performs media channel function, such as opening, closing, adding and removing channel network sources and destinations. The call signaling interface module 1750 performs functions for establishing initial call setup between end-points through the PTS, where the procedure for call setup depends on standard, such as SIP and Q.931. The network interface module 1760 provides basic input and/or output communication interfaces. The basic input and/or output is the lowest level of communication over which more complex messaging is performed.

The transcoding module 1770 performs the actual transcoding function including transcoding between MPEG series, H.26X video series, GSM-AMR and G.72X audio codec series. Other examples of PTS transcoding may include at least MPEG2-audio to MPEG4-audio, G.723.1 to GSM-AMR, MPEG2-video to MPEG4-video, H.263 to MPEG4-video. The rate control module 1780 performs a throttling function and prevents network segments over which the end-points communicate from being overloaded. The intellectual property rights management module 1790 protects the IP rights. For example, the management module 1790 uses data on IP rights in a bitstream, and assists on implementing mechanisms for auditing, monitoring, billing, and protection of the IP rights associated with the received and transcoded bitstream. The capabilities processing module 1792 utilizes data in received messages to find the best matching mode for the specific media that is transmitted from one end-point to another.

The architecture of a PTS determines performance, cost, and time-to-market of the server. Performance may be considered as the number of simultaneous gateway channels or calls that the PTS may simultaneously process. Furthermore, for a fixed number of channels, the cost and performance of the architecture will depend on the following factors:

1. Bus architecture;
2. Transcoding architecture and hardware for various video and audio transcoding;
3. Network off loading for connecting to MGC and other gateway components; and
4. Operating System.

Figure 18:
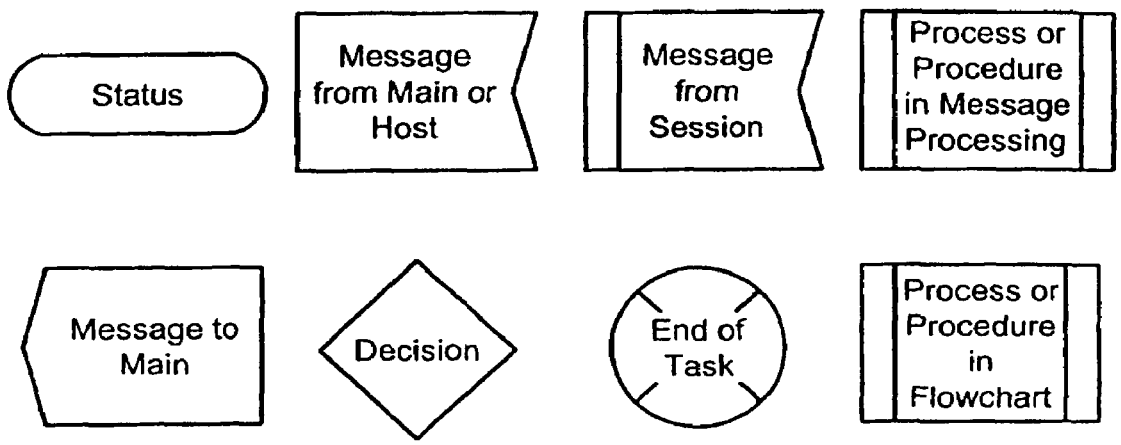
FIG. 18 is a simplified flow diagram illustrating symbols used in the flow diagrams.

FIG. 18 shows an explanation of the symbols used in the flow charts. This diagram is merely an example, which should not unduly limit the scope of the claims herein. One of ordinary skill in the art would recognize many other variations, modifications, and alternatives.

Figure 19:
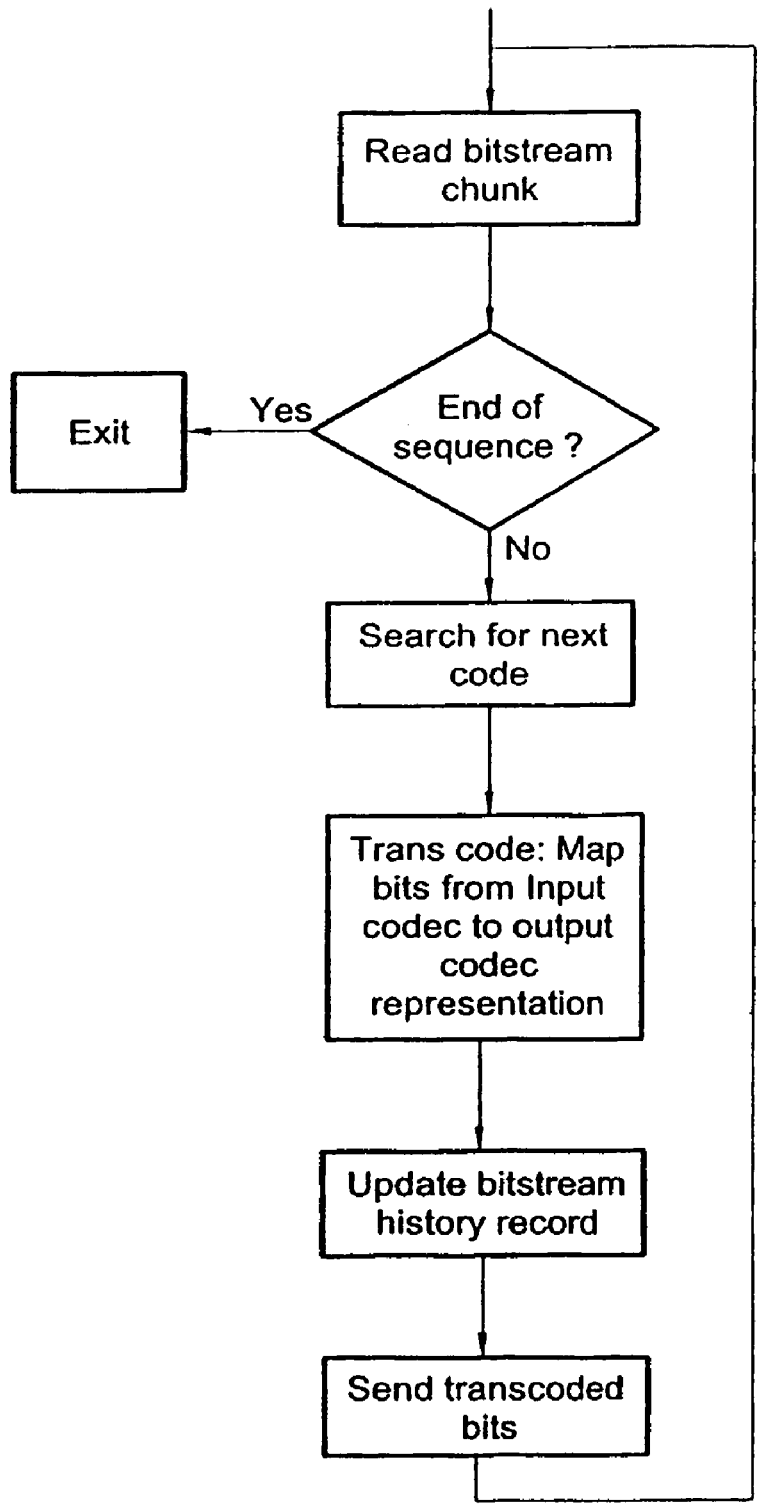
FIG. 19 is a simplified flow diagram illustrating one embodiment of the transcoding procedure.

FIG. 19 shows a simplified flow chart illustrating the high-level procedure for video bitstream transcoding that may be used in a PTS according to an embodiment of the present invention. This diagram is merely an example, which should not unduly limit the scope of the claims herein. One of ordinary skill in the art would recognize many other variations, modifications, and alternatives. The procedure reads a chunk of bits and if the end-sequence marker is detected then it ends. Otherwise it reads the next code word, transcodes the code word to the output protocol codeword, updates the history record and emits the transcoded bits to the output buffer which is flushed according to a rate control scheme as to avoid that the input buffer at the receiving end-point does not overflow.

Figure 20:
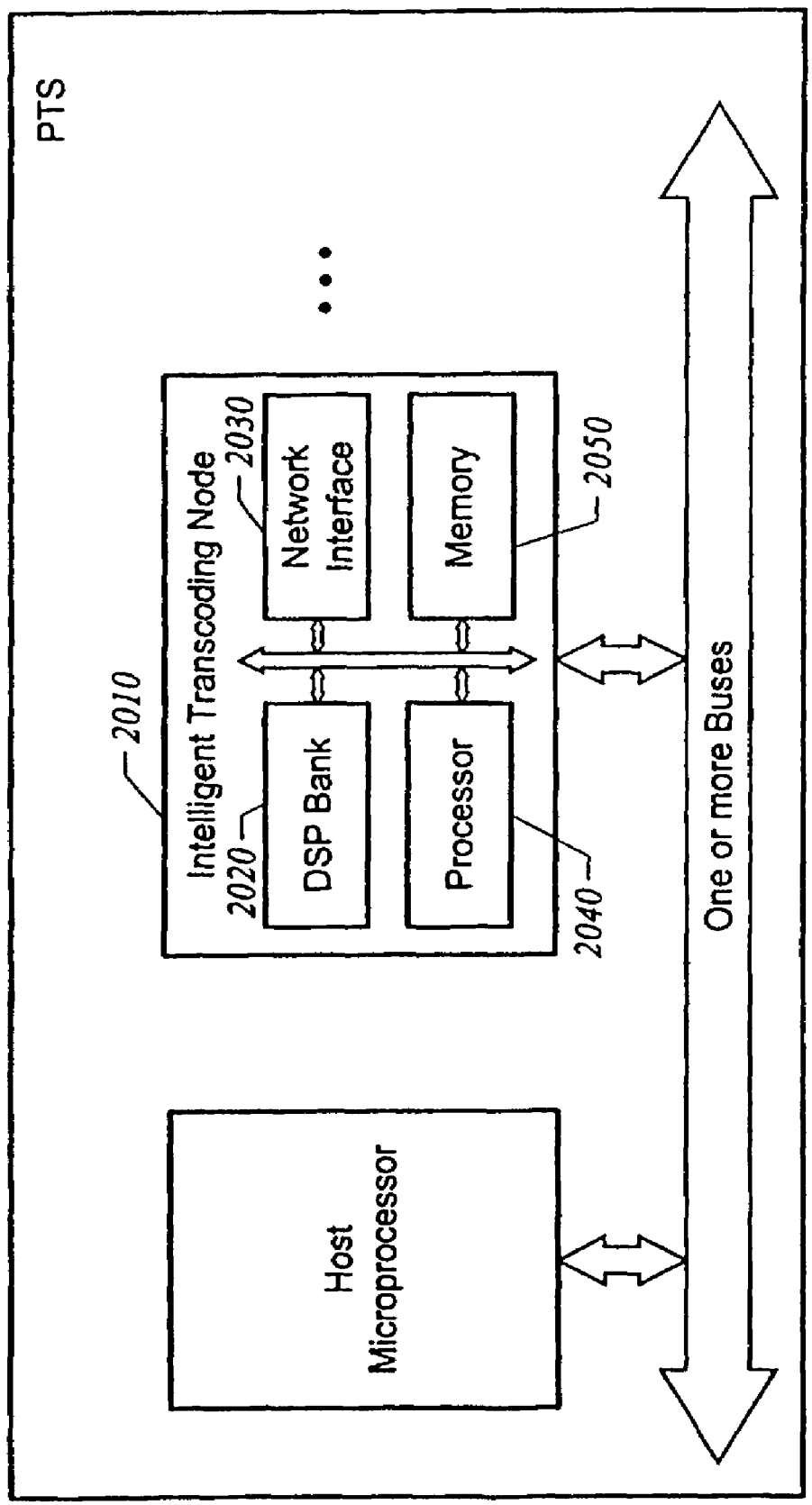
FIG. 20 is a simplified block diagram illustrating one embodiment of a PTS's hardware architecture.

FIG. 20 illustrates a PTS hardware architecture according to an embodiment of the present invention. This diagram is merely an example, which should not unduly limit the scope of the claims herein. One of ordinary skill in the art would recognize many other variations, modifications, and alternatives. The architecture features an intelligent transcoding node 2010, which is a bus card including one or more processors, a bank of DSP processors 2020, one or more network interfaces 2030, one or more processors 2040, and a memory bank 2050. This architecture has several advantages. First, the network interface 2030 is embedded in the intelligent transcoding node bus-card 2010. Hence the call processing and transcoding are performed locally on the bus-card 2010. Second, one or more network interfaces per processing node are possible. Third, the architecture can support a large number of simultaneous calls because of compactness of its processing modules.

In addition to the embodiment in FIG. 20, numerous architectures for a PTS are possible, a few of which are listed below:

1. Standalone chassis with bus-cards;
2. PC-like implementation as described below;
3. Firmware to existing processing hardware, including ASICs;
4. Software running on existing hardware;
5. Software running on existing hardware with hardware acceleration by the means of ASICs, DSPs, or other types of processors; and
6. ASIC chipset.

Figure 21:
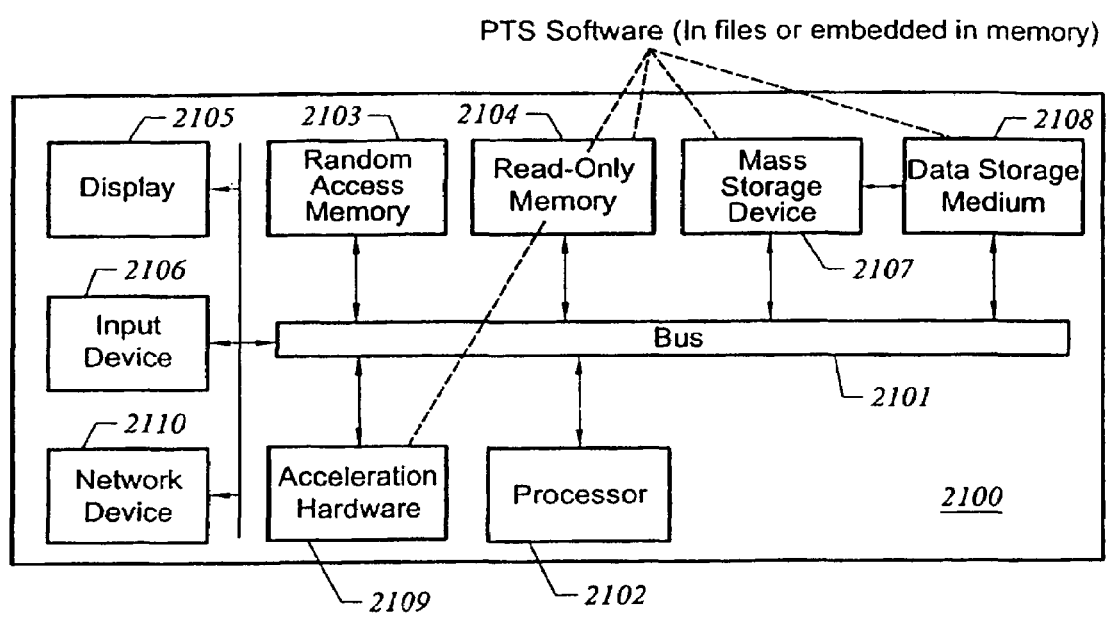
FIG. 21 is a simplified block diagram of a computer system that may be used to implement an embodiment of the invention.

FIG. 21 shows an embodiment of a computer system according to the present invention. This diagram is merely an example, which should not unduly limit the scope of the claims herein. One of ordinary skill in the art would recognize many other variations, modifications, and alternatives. The present invention may be implemented in a personal computer (PC) architecture. Alternative computer system architectures, or other programmable or electronic-based devices may also be employed.

In FIG. 21 a computer system 2100 comprises a bus 2101 for communicating information, a processor 2102 coupled to the bus 2101 for processing information, random access memory 2103 coupled to the bus 2101 for storing information and instructions for the processor 2102, a read-only memory 2104 coupled to the bus 2101 for storing static information and instructions for the processor 2102 and PTS applications, a display device 2105 coupled to the bus 2101 for displaying information for a user, an input device 2106 coupled to the bus 2101 for communicating information and command selections to the processor 2102, and a mass storage device 2107, e.g., a magnetic disk and associated disk drive, coupled to the bus 2101 for storing information and instructions. A data storage medium 2108 contains digital information, e.g., PTS software modules, and it is coupled to the bus 2101 and configured to operate with mass storage device 2107 to provide the processor 2102 access to digital information stored on the data storage medium 2108 through the bus 2101. A hardware transcoding acceleration module 2109 comprises printed circuit boards, Digital Signal Processors, ASICs, and FPGAs. The module 2109 is communicatively coupled to the bus 2101, and may have an embodiment similar to the intelligent transcoding node 2010 as shown in FIG. 20.

Processor 2102 may be any of a wide variety of general purpose processors or microprocessors, e.g., the Pentium™ processor manufactured by Intel Corporation, and a MIPS processor manufactured by MIPS Technologies, Inc., of 2011 N. Shoreline Blvd., Mountain View, Calif. 94039-7311. Other varieties of processors such as digital signal processors (DSPs) may also be used in the computer system 2100. The display device 2105 may be a liquid crystal device, cathode ray tube (CRT), or other suitable display device. The mass storage device 2107 may be a conventional hard disk drive, a floppy disk drive, a CD-ROM drive, or other magnetic or optical data storage device for reading and writing information stored on a hard disk, a floppy disk, a CD-ROM, a magnetic tape, or other magnetic or optical data storage medium. The data storage medium 2108 may be a hard disk, a floppy disk, a CD-ROM, a magnetic tape, or other magnetic or optical data storage medium.

In general, the processor 2102 can retrieve processing instructions and data from the read-only memory 2104. The processor 2102 can also retrieve processing instructions and data from the data storage medium 2108 using the mass storage device 2107 and downloads the information into the random access memory 2103, which may be a SDRAM. The processor 2102 then executes an instruction stream from the random access memory 2103 or read-only memory 2104. Command selections and information input at the input device 2106 may direct the flow of instructions executed by the processor 2102. Input device 2106 may be, among others, a pointing device such as a conventional mouse or a trackball device. The execution results may be displayed on the display device 2105. The computer system 2100 also comprises a network device 2110 for connecting the computer system 2100 to a network. The network device 2110 may be an Ethernet device, a phone jack, a satellite link, or other device.

Embodiments of the present invention may be represented as a software product stored on a machine-accessible medium, also referred to as a computer-accessible medium or a processor-accessible medium. The machine-accessible medium may be any type of magnetic, optical, or electrical storage medium including a diskette, a CD-ROM, a memory device, either volatile or non-volatile, an ASIC, a firmware to an ASIC, a system-on-chip, or other storage mechanism. The machine-accessible medium may contain various sets of instructions, code sequences, or configuration information. Other data necessary to implement the present invention may also be stored on the machine-accessible medium. As merely an example, transcoding techniques are described in U.S. Provisional Ser. No. 60/347270, commonly assigned, and hereby incorporated by reference for all purposes.

In addition to media transcoding that the PTS can perform, it can also perform system protocol transcoding. A multimedia system protocol is typically an umbrella of protocols that define how multimedia end-points can connect to each other, can issue and interpret commands (such streaming or opening a video channel), can tear down connections, can join conferences. A system protocol typically covers the following important aspects: call signaling, command and control, media transports aspects, and media coding aspects. For example the H.323 system protocol standard covers H.225.0/Q.931 for call signaling and media transports, H.245 for command and control, and a number of audio and video codecs. The H.324 system protocol standard covers H.223 (media and data bitstreams multiplexing), H.245 for command and control, and a number of audio and video codecs. Although some aspects of H.323 and H.324 are similar, H.323 is packet based whereas H.324 is circuit based. Hence for H.323 and H.324 end-points to communicate, system protocol transcoding needs to be performed, at the call-signaling level, command and control levels and media coding levels. The PTS performs both system protocol transcoding and media (audio and video) transcoding. From the PTS point of view, the Call signaling transcoding is the process of proxying the end-points (H.324, H.323, SIP, RTSP, and others) so they can connect to each other. From the command and control point of view, the PTS performs the transcoding so messages such as terminal capabilities, open/close logical channels, etc., are translated so they can be understood by the terminal receiving the command and control message. The PTS has to perform translation of the issued messages it receives from the sending end-point so they could be understood by the receiving terminal. In terms of media transport, the PTS needs to access data by demultiplexing from circuit bearer channels, extracting the media service data units, transcoding the media bits and then packaging the transcoded bits so they can be sent in a format the receiving end point can understand. Is the receiving end point is H.323, the packaging would involved RTP packetization. So the media transport transcoding (translation) consists of circuit-to-packet, packet-to-circuit and packet-to-packet translation of the media bits. When the transport is circuit based, the typically the media bits are multiplexed in a Time Domain Multiplexing (TDM) fashion.

The following sections describe further aspects of the invention in the context of two specific embodiments—the DCT 1000 AND DCT 2000 embodiments.

I. Overview of the DCT 1000 and DCT 2000 Embodiments

People today have an increasing expectation and demand to communicate and access information services wherever they are. The increasing availability and reducing costs of bandwidth, means that these interactions are becoming media rich, encompassing audio, video and a wide variety of data formats.

The demand for universal access has created a wide variety of network solutions, encompassing fixed switched and packet based networks, wireless and mobile systems. It has also created a wide variety of terminals and client devices, from high end workstations, Personal Computers and Laptops to Personal Digital Assistants (PDAs) and mobile phones, which are provided with a range of network interfaces.

Figure 22:
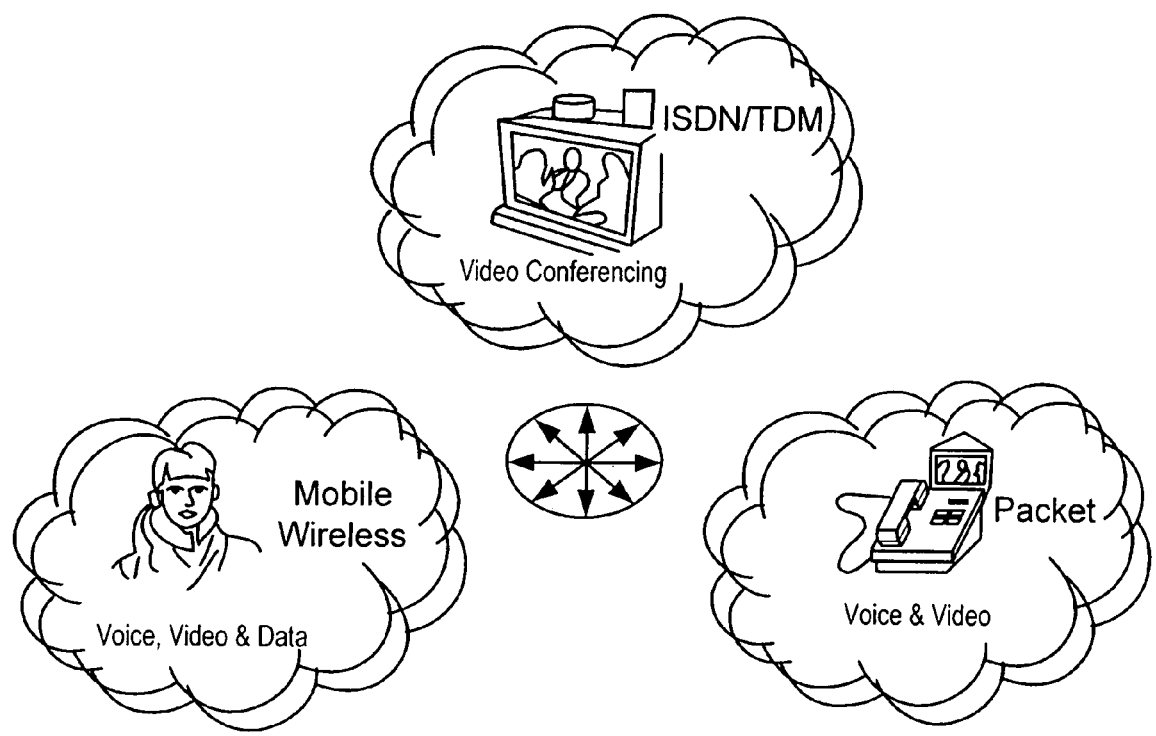
FIG. 22 is a simplified schematic diagram of networks and protocols according to embodiments of the present invention.

In particular, as the bandwidth of mobile and wireless networks increases with the deployment of 2.5G and 3G networks, users of mobile devices can access the same rich media content and services as broadband users. They will want to exchange audio, video and a variety of data with other users on the same mobile/wireless network, on other mobile/wireless networks, and with users and servers on different networks. These include the fixed Internet, which has much greater bandwidth and its own collection of devices and appliances, legacy Integrated Services Digital Networks (ISDN), and the existing General Switched Telephone Network (GSTN) as shown in FIG. 22.

Different clients have different capabilities. Wireless and mobile devices are designed to be small and lightweight, with long battery life for mobility, and consequently have constrained memory, processing power, communications bandwidth, and display capabilities. Current and future Landline communication equipment faces a different set of constraints to mobile/wireless devices.

The varying characteristics of different networks and their terminals equipment has resulted in the development of international communications standards that are domain specific. The focus has been on interoperability of clients or terminals within a domain, such as the ISDN network. This is especially true at the higher layers of communications protocol stacks dealing with specifying media types and capabilities. An example of the problem is in the wide variety of speech coding standards used for terminals in different networks—G.711 for POTS, G.729 and G.723.1 for Voice over IP (VoIP), GSM-AMR and a range of other codecs used on different mobile networks. Another significant example is multimedia communications protocols such as the ITU-T H32x series standards, where there are significant differences between H.320 (for ISDN), H.323 (for Internet I LAN) and H.324/M (for GSTN and Mobile networks) in the coding schemes, call control and capability exchange and multiplexing. This creates a significant problem for universal access!

Figure 23:
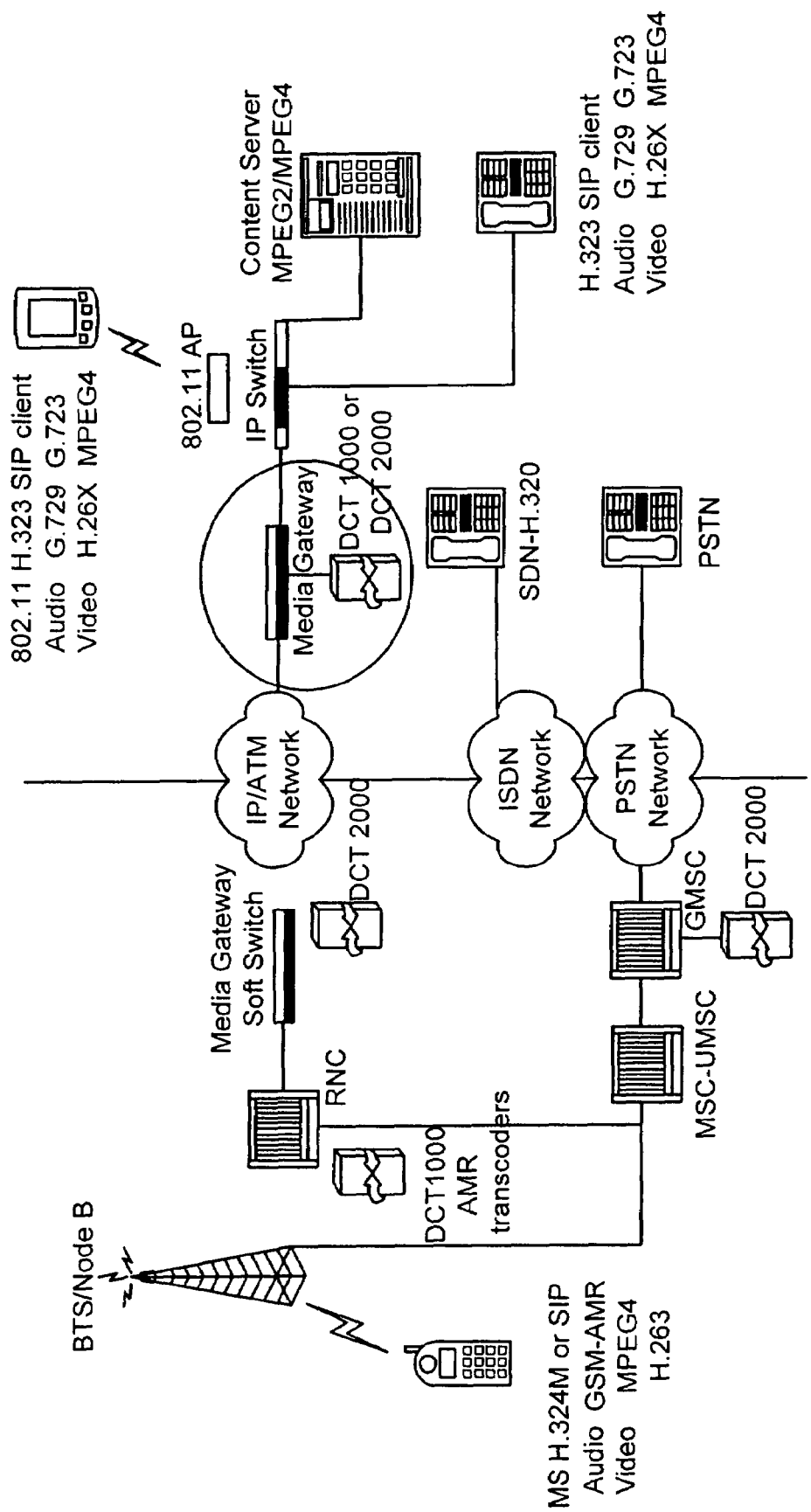
FIG. 23 is a network connectivity diagram for 3G mobile and landline (packet, PSTN and ISDN) networks illustrating locations where transcoding may be employed (as necessary or optional) according to embodiments of the present invention.

In order to achieve convergence whilst ensuring a return on investment in already deployed legacy equipment, the problem of interoperability needs to be addressed. This is illustrated in FIG. 23 where we show a small number of possible situations where access between end-points needs to be mediated at various levels. The mediation essentially involves the translation of protocols used by specific networks and end-points. For the access to be transparent to the end-user, the mediation needs to be performed seamlessly and on the fly.

Dilithium Networks has the solution to the problem of universal access. The Dilithium Networks Core Transcoding (DCT) series provides unique solutions for connecting Users of different protocols, allowing people to connect to other people from any device anywhere.

The Dilithium DCT family of products provides a coherent solution for connecting multimedia systems based on different network types and communication protocols, encompassing mobile. GSTN, ISDN and IP. For example, a 3G mobile user wanting to connect and exchange video/audio/data with a user on the internet will require bidirectional translation of audio, video, packetisation, multiplexing protocols between the 3G terminal and the land line Internet terminal.

The Dilithium Networks DCT family of products currently includes two members: DCT 1000 and DCT 2000. We discuss the market, features and architecture of the DCT series in the following sections.

II. Market & Features of the DCT 1000 AND DCT 2000 Embodiments

The Dilithium DCT series feature scalable intelligent carrier class network engines which transcode in realtime intelligently (without full decode and recode) and on the fly between the important and emerging standards in audio, including GSM-AMR, EVRC, G.723.I, G.729, and video, including MPEG-4, H.263 and H.261.

Figure 24:
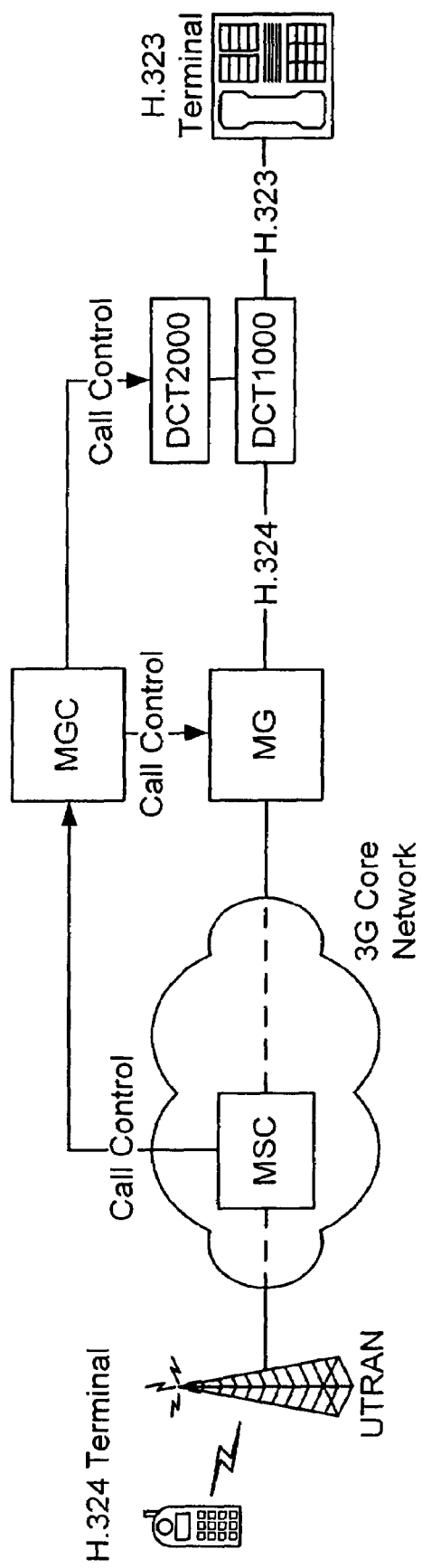
FIG. 24 illustrates an example deployment of DCT 2000 for 3G circuit switched to H.323 call handling according to embodiments of the present invention.

The DCT solution series is targeted at the multimedia gateway market, whether on the edge of mobile networks, land line networks or in customer premises. FIG. 24 shows an example of a 3G mobile user using a handset with protocols (access or media coding protocols) which are different from that of the other user, who may be on a Local Area Network (LAN). In this case the DCT 1000 provides a solution to the media transcoding. The DCT 2000 provides associated call signaling, multiplex/demultiplexing, packetisation/de-packetisation, and command and control transcoding in addition to media transcoding.

Figure 25:
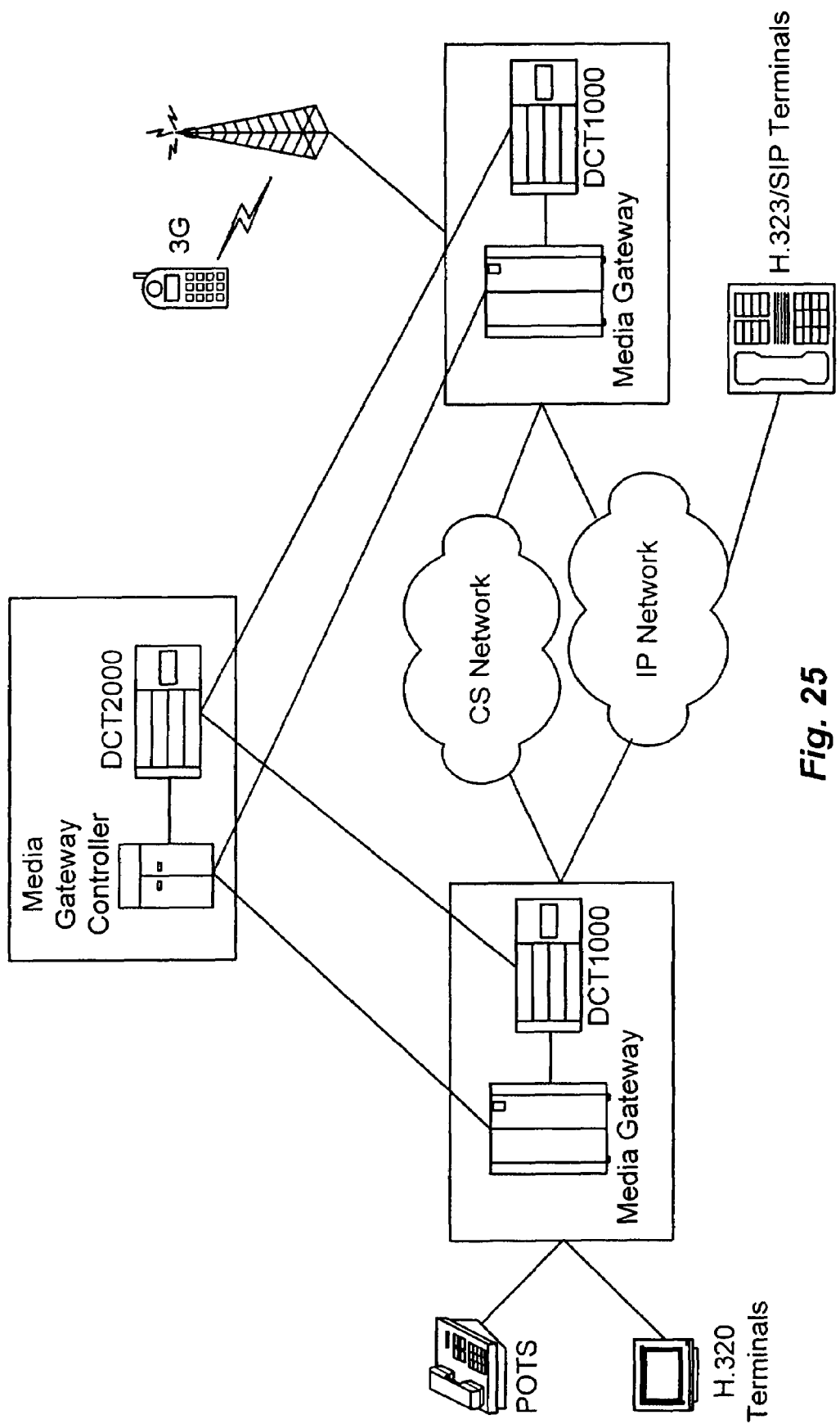
FIG. 25 is a diagram showing the inter-working of DCT with media gateways and media gateway controllers according to embodiments of the present invention.
Figure 26:
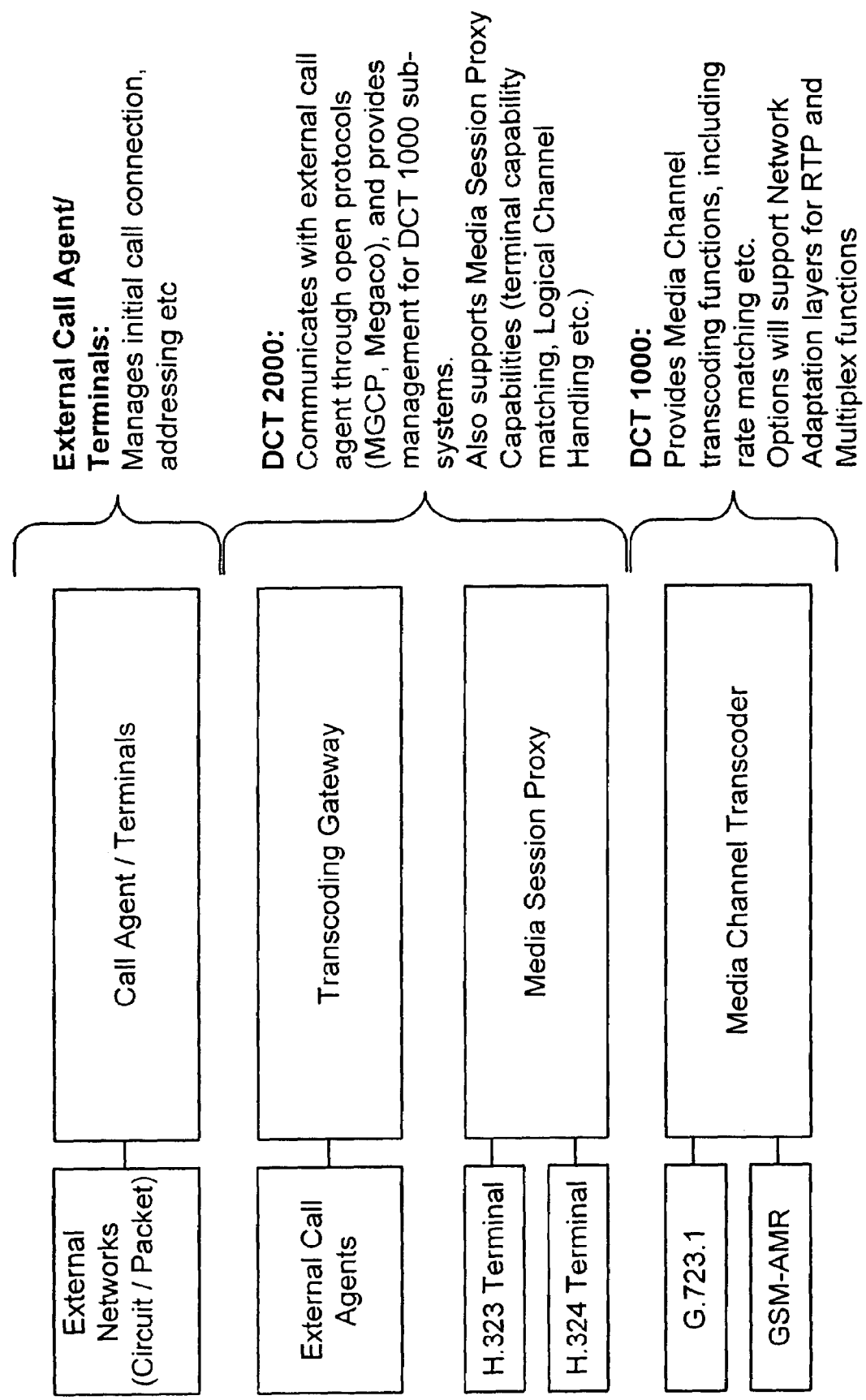
FIG. 26 illustrates the structure of a DCT product family according to an embodiment of the present invention.

The Dilithium DCT 2000 and DCT 1000 can be deployed along side existing Media Gateway Controller (MGC) and Media Gateways (MG) systems to provide support for multimedia communications as shown in FIG. 23 and FIG. 24, and in more detail in FIG. 25. The DCT 2000 works with Call Agents/Media Gateway Controllers to handle Call Signaling translation functions, and to control transcoding and multiplex functions within the DCT 1000 systems. DCT 1000 systems act as slave devices to Media Gateways, to perform network adaptation operations (Multiplex and Packetisation functions), and transcode individual media streams.

Examples of other target markets for the DCT series include Messaging Centers and Media Servers. For example in a Messaging Center users may retrieve audiovisual messages through a variety of access methods (Packet or circuit) using end-point devices that have different audio/video coding protocols. Messages may be stored in MPEG4video format, but the device used to retrieve them may only support fI.263. In this case on-the-fly transcoding is needed.

DCT 1000

The Dilithium Core Transcoder, DCT 1000, supports a variety of audio and video protocols, and includes features such as adaptive rate control and rate switching. The DCT 1000 is compact PCI based and is available with a selection of high-speed network interfaces, allowing it to interface in a range of service and network configurations. Inside the DCT 1000 are one or more host cards, one or more network cards, and transcoding engine cards. The transcoding engine cards are hot swappable, allowing maintenance without interrupting service, These cards operate independently, with each controlled by an on-board host processor which distributes the load to a bank of transcoding co-processors (DSPs). The capacity of the DCT 1000 can be expanded to match growing capacity requirements on the fly, simply by adding additional transcoding engine cards.

The DCT 1000 is scaleable in terms of features, capacity and market applications. These benefits present a number of key value propositions to a wide range of customers including communications. equipment providers, device/endpoint manufacturers, local exchange earners, mobile network operators, Internet service providers, and content providers and aggregators:

Ability to react quickly in deploying new content or services, with minimal customization of the network.

Scaleable media experience; fine grained control over bit rate allows carriers to accurately target plans to different customer demographics.

Use of the network through efficient transcoding and rate control results in lower operating costs, higher grade of service.

Ability to bridge legacy networks, giving infrastructure.

The DCT 1000 can support optional extensions to perform:
Multiplexing and demultiplexing according to ITU H.223 (and mobile annexes A, B and C) as used by H.324/H.324M/3GPP-324M, and Packetisation according to the Real-Time Protocol (RFC 1889) including support for the ITU H.225.0 packetization and synchronization standard used in H.323, and various RTP payload formats for audio and video as required by the ITU H.323 standard.

Packetisation according to the Real-Time Protocol (RFC 1889) including support for the ITU H.225.0 packetization and synchronization standard used in H.323, and various RTP payload formats for audio and video as required by the ITU H.323 standard.

DCT 2000

The DCT 2000 extends the functionality of the DCT 1000, supporting a wide range of audio and video protocols, and featuring smart end-points capability processing to provide transcoding tailored to end-points such as mobile phones and PDAs. The DCT 2000 is compact PCI based and is available with a selection of high-speed network interfaces, allowing it to interface in a variety of service and network configurations. Transcoding cards are hot swappable, allowing maintenance without interrupting service. These cards operate independently, with each controlled by a host processor which distributes the load to a bank of transcoding co-processors (DSPs). As in the case of the DCT 1000, the capacity of the DCT 2000 can be expanded to suit specific capacity requirements on the fly simply by adding additional cards.

The DCT 2000 is scaleable in terms of features, capacity and market applications. These benefits present a number of key value propositions to a wide range of customers including communications equipment providers, device/endpoint manufacturers, local exchange carriers, mobile network operators, Internet service providers, and content providers and aggregators:

Smart end-points capability processing to provide transcoding tailored to endpoints such as mobile phones and PDAs.

Automatic handling of client (end-points) capability detection, matching and conversion of command and control media session announcements.

A universal media experience, capabilities exchange and mode selection within the system supports a wide variety of devices, handsets and suppliers without need for the customer to customize their network;

The DCT 2000 provides support for the following protocols:
H.324/H.324M/3GPP-324M
H.323
SIP (available in Release 2 of CT 2000)

The DCT 2000 provides call-termination and proxy functions enabling H.324/H.324M/3GPP-324M terminals to interoperate with H.323 terminals including Voice Over IP (VoIP) end-points. The DCT 2000 provides H.245 (H.324/H.324M/3GPP-324M) to/from H.245 (H.323) command and control transcoding including all mandatory signaling entities such as Terminal Capability exchange, Master-Slave determination, multiplex table termination, opening and management of logical channels and translation of multiplex structuring.

The DCT 2000 acts as an H.324/M/3GPP-324M terminal or as a H.323 terminal proxy. For example when proxying a call from H.324M terminal to allow it to connect to a H.323 terminal, the DCT 2000 will perform all the protocol functions expected from a H.324M terminal and transcode all protocol information to be transferred to the H.323 terminal.

III. Architecture of the DCT 1000 and DCT 2000 Embodiments

Figure 27:
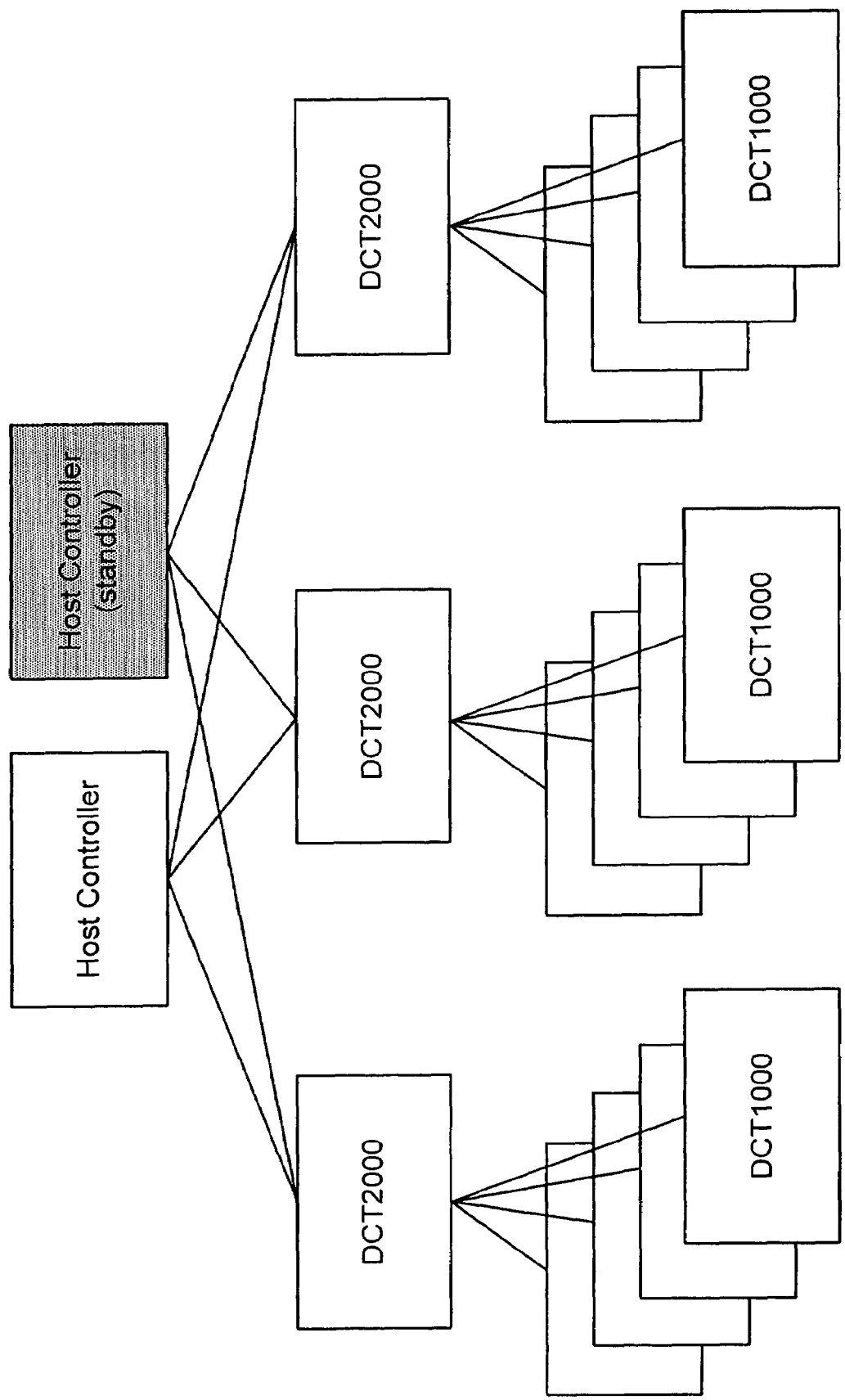
FIG. 27 is a system configuration for scalable deployment of DCT systems according to embodiments of the present invention.
Figure 28:
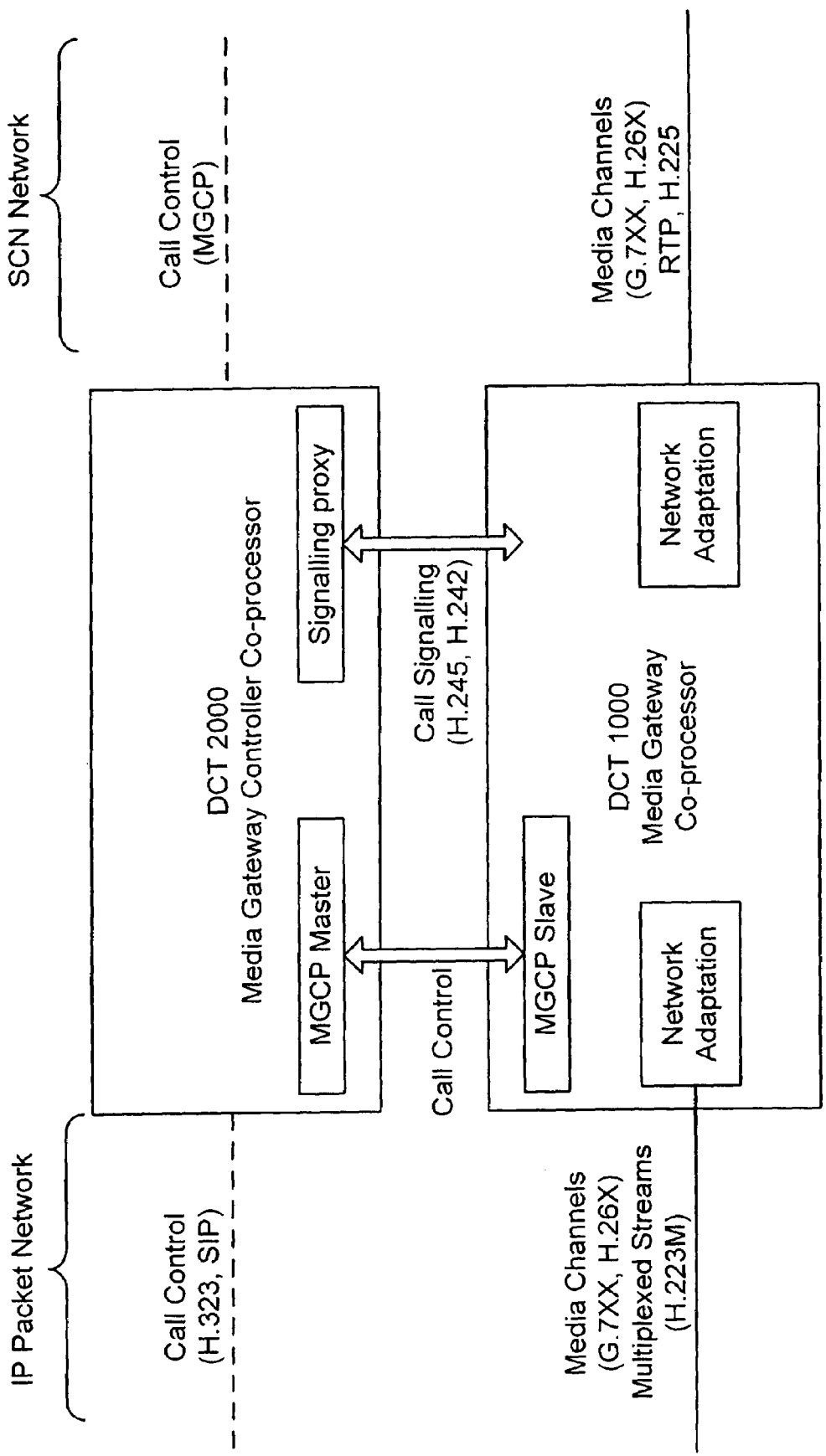
FIG. 28 is an entry level DCT System configuration according to an embodiment of the present invention.
Figure 29:
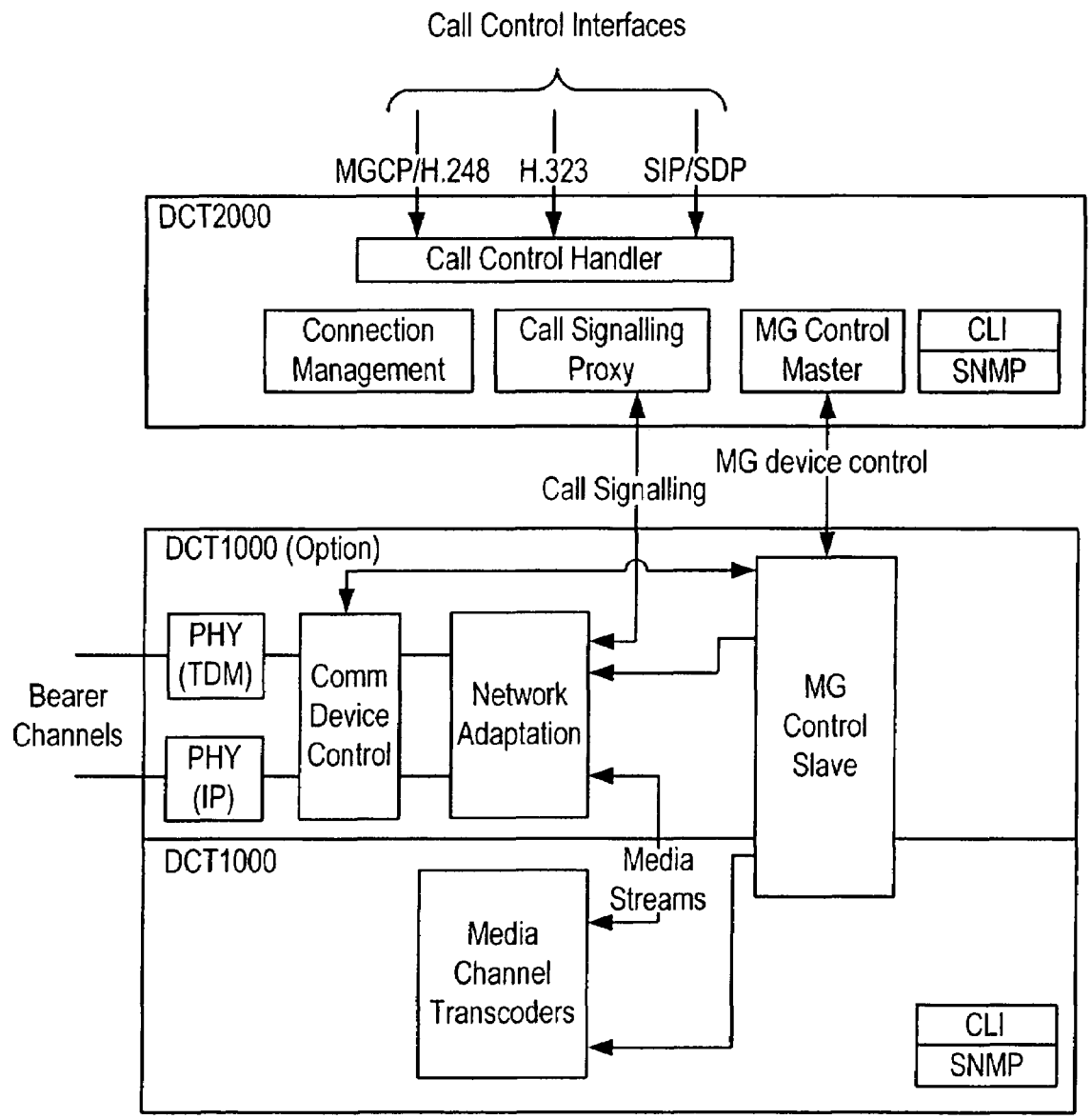
FIG. 29 is an architecture and connectivity diagram of the DCT 1000 and DCT 2000 products according to embodiments of the present invention.

As shown in FIG. 27, the DCT components can be configured as a multi-board system within a single or multiple PCI chassis to provide a scalable platform to meet customer requirements, which can grow linearly as customer capacity requirements increase. When a smaller system is required, the DCT 2000 may be run on a single Host Controller platform to provide an entry level solution. In terms of system integration the DCT 2000 and 1000 operate in a master slave configuration as shown in FIG. 28 and FIG. 29.

DCT 1000

The DCT 1000 is responsible for performing all media stream transcoding functions, and when extended with the network adaptation options will support packetisation/multiplex operations as required by H324/M and H.323 multimedia sessions, including H.225 and H223.

The DCT includes network interface devices used to carry sessions, and supports all required packetisation/framing operations for E1, ISDN and Ethernet interfaces. In the case where the connection establishment process is supported within the multimedia specification (e.g., Q.931 in H.323, or H.324 delivered over ISDN circuits) the connection events are passed to the DCT 2000, where they may be handled by an external MGC/Call Agent if required. The DCT 1000 can be controlled through either Open Standard MG control protocols or a Development kit API if required.

DCT 2000

The DCT 2000 is responsible for allowing different multimedia session protocols to interoperate. This includes, but is not limited to, inter-working between MGGP/H.248 and H.323, SIP/SDP and H.323, SIP/SDP and MGCP/H.248.

All call signaling messages are passed from the DCT 1000 to the DCT 2000 for handling, providing correct and efficient handling of H.245 and H.242 signaling as required. Control of resources within the DCT 1000 is maintained through an Open Standard MG control protocol. The DCT 2000 also provides interfaces to external call control systems (Media Gateway Controllers, Call Agents etc.) through MGCP, H.248 and SIP interfaces.

IV. Specifications of the DCT 1000 and DCT 2000 Embodiments

DCT 10000
Transcoding capabilities (media Stream Transcoding between the following formats):
G.723.1 GSM-AMR
G.729 GSM-AMR
G.723.1 G.729
G.723.1 EVRC
G.729 EVRC
EVRC GSM-AMR
H.263 MPEG4
H.263 H.261
Network Adaptation
RTP and RTP payload formatting for supported audio and video codecs.
H.223 (including annexes A, B and C)
H.225.0
Q.931
Network interfaces
DS-1/E1

ISDN PRI (requires Q.931 option)
Ethernet (10/100baseT)
Independent Ethernet Interface for control/management (10/100)
Communication and call server Interfaces
Based on open standard protocols
Will comply with H.248 when ratified
DCT 1000 developers API available for custom applications
Management Support
SNMP MIB
SNMP Alarams
CLI
DCT 2000
Session Proxy capabilities
H:324 H.323 (H.245 H.245) Supports all mandatory H.245 features, including Terminal Capability Exchange, Logical Channel Signal handling etc.
H.323 SIP (v2)
H.320 H.323 (H.242 H.245) (v2)
Network interfaces
Ethernet interface for call signaling communications
Independent Ethernet interface for control/management (10/100)
Communication and call server Interfaces
Based on open standard protocols
Supports H.323, MGCP, H.248 (when ratified), SIP/SDP (version 2)
Management Support
SNMP MIB
SNMP Alarms
CLI While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein.

What is claimed is:

1. A system for mediating a session between a first device operating on a first network using a first protocol and a second device operating on a second network using a second protocol, the system comprising:
    a first port adapted to:
        receive a first media stream from the first device; and
        receive a first command and control stream from the first device;
    a second port adapted to:
        transmit a second media stream to the second device; and
        transmit a second command and control stream to the second device;
    an adaptation module coupled to the first port and the second port, wherein the adaptation module is adapted to perform:
        demultiplexing or depacketizing of the first media stream; and
        multiplexing or packetizing of the second media stream;
    a media adaptation module coupled to the first port and the second port, wherein the media adaptation module is adapted to receive the first media stream and transmit the second media stream based on the first media stream, wherein transmission of the second media stream is performed in real-time, wherein the media adaptation module is further adapted to perform a transcoding process, the transcoding process comprising:
        determining that at least a portion of the first media stream is supported by the second device;
        decoding a second portion of the first media stream to provide a decoded portion; and
        encoding the second media stream using the at least a portion and the decoded portion; and
    a command and control module coupled to the first port and the second port, wherein the command and control module is adapted to decode the first command and control stream and encode the second command and control stream based in part on the first command and control stream.

2. The system of claim 1 wherein the first network is different from the second network.

3. The system of claim 1 wherein the first protocol is different from the second protocol.

4. The system of claim 1 wherein the first network is circuit switched and the second network is circuit switched.

5. The system of claim 4 wherein the first network is a voice only circuit switched network and the second network is a 3G-324M circuit switched network.

6. The system of claim 1 wherein the first network is circuit switched and the second network is packet switched.

7. The system of claim 6 wherein the first network is a voice only circuit switched network and the second network is a SIP packet switched network.

8. The system of claim 1 wherein the first network is packet switched and the second network is circuit switched.

9. The system of claim 8 wherein the first network is a voice only packet switched network and the second network is a 3G-324M circuit switched network.

10. The system of claim 1 wherein the first network is packet switched and the second network is packet switched.

11. The system of claim 10 wherein the first network is a voice only packet switched network and the second network is a SIP packet switched network.

12. The system of claim 1 wherein:
    the first protocol comprises an H.324 protocol, an H.324M protocol, or a 3G-324M protocol; and
    the second protocol comprises a SIP or an H.323 protocol.

13. The system of claim 1 wherein the system comprises two or more devices.

14. The system of claim 13 wherein the two or more devices communicate using a packet switched protocol.

15. The system of claim 13 wherein the first port is located on a first device of the two or more devices and the second port is located on a second device of the two or more devices.

16. The system of claim 1 wherein the first media stream and the second media stream are audio.

17. The system of claim 1 wherein the first media stream and the second media stream are video.

18. The system of claim 1 wherein the second media stream is rate controlled.

19. The system of claim 18 wherein a bit rate associated with the second media stream is maintained substantially near a targeted rate.

20. The system of claim 1 wherein the command and control module is further adapted to negotiate session characteristics with the first device and with the second device.

21. The system of claim 1 further comprising:

a second media adaptation module coupled to the first port and the second port;

and wherein:

the first port is further adapted to receive a third media stream from the first device;

the second port is further adapted to transmit a fourth media stream from the first device; and the second media adaptation module is further adapted to decode the third media stream and encode the fourth media stream based on the third media stream, wherein encoding of the fourth media stream is performed in near real-time.

22. The system of claim 21 wherein the first media stream is audio and the third media stream is video.

23. The system of claim 1 wherein the media adaptation module is further adapted to encode audio information utilizing at least one of a GSM-AMR, EVRC, G.723.1, or G-729 codecs.

24. The system of claim 1 wherein the media adaptation module is further adapted to encode video information utilizing at least one of an H.263 codec or an MPEG-4 codec.

25. The system of claim 1 wherein encoding of the second media stream in real-time comprises:

decoding a first element of the first media stream; and encoding a second element in the second media stream, wherein the second element corresponds to the first element and a time associated with decoding the first element and encoding the second element is less than 400 ms.

26. The system of claim 25 wherein the time associated with decoding the first element and encoding the second element is less than 150 ms.

27. The system of claim 1 further comprising a call signaling module coupled to the first port and the second port, wherein:

the call signaling module is adapted to decode the first one or more call signaling messages and encode the second one or more call signaling messages based on the first one or more call signaling messages; and the first port is further adapted to receive a first one or more call signaling messages from the first device and the second port is further adapted to transmit a second one or more call signaling messages to the second device.

* * * * *